(12) United States Patent  
Shin et al.

(10) Patent No.: US 9,829,924 B2  
(45) Date of Patent: Nov. 28, 2017

(54) PORTABLE ELECTRONIC DEVICE

(71) Applicant: LG ELECTRONICS INC., Seoul (KR)

(72) Inventors: Choonghwan Shin, Seoul (KR); Byunghwa Lee, Seoul (KR); Samsick Kim, Seoul (KR); Donghwan Yu, Seoul (KR); Seojin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 14/689,110

(22) Filed: Apr. 17, 2015

(65) Prior Publication Data

US 2016/0070304 A1 Mar. 10, 2016

(30) Foreign Application Priority Data

Sep. 5, 2014 (KR) .................. 10-2014-0119228

(51) Int. Cl.
| | |
|---|---|
| *G06F 1/16* | (2006.01) |
| *G06F 3/0488* | (2013.01) |
| *H04M 1/02* | (2006.01) |
| *G06F 1/32* | (2006.01) |

(52) U.S. Cl.
CPC .......... *G06F 1/1652* (2013.01); *G06F 1/1656* (2013.01); *H04M 1/0268* (2013.01); *G06F 1/3206* (2013.01)

(58) Field of Classification Search
CPC .... G06F 1/1616; G06F 1/1652; G06F 1/1681; H04M 1/0216; H04M 1/0268; H04M 1/02; H04M 1/03; H04M 1/022; H04M 2250/16; H04M 2250/22; H04M 2250/52; G09G 2380/02; G03B 2205/0076; F03G 7/065; C22F 1/006; C22F 1/08; C22F 1/10

USPC .................. 60/516–529; 148/563; 396/133  
See application file for complete search history.

(56) References Cited

U.S. PATENT DOCUMENTS

| | | | | |
|---|---|---|---|---|
| 6,655,011 | B1* | 12/2003 | Kornrumpf | H01H 1/0036 257/690 |
| 8,733,099 | B2* | 5/2014 | Torres-Jara | F03G 7/06 60/527 |
| 9,314,885 | B2* | 4/2016 | Chen | B23P 11/00 |
| 9,405,368 | B2* | 8/2016 | Modarres | G06F 3/0412 |
| 2013/0127690 | A1* | 5/2013 | Tsai | G09F 9/301 345/55 |
| 2013/0169515 | A1* | 7/2013 | Prushinskiy | G06F 1/1652 345/55 |
| 2013/0222349 | A1 | 8/2013 | Baek et al. | |
| 2013/0258565 | A1* | 10/2013 | Nishi | H05K 7/14 361/679.01 |
| 2014/0003006 | A1 | 1/2014 | Ahn | |

(Continued)

*Primary Examiner* — Bryan Earles  
(74) *Attorney, Agent, or Firm* — Birch, Stewart, Kolasch & Birch, LLP

(57) ABSTRACT

A portable electronic device including a flexible display unit; an elastically-deformable supporting member disposed below the flexible display unit and configured to be deformed together with the flexible display unit; a pressing member disposed below the supporting member and configured to change shape; and a controller electrically-connected to the pressing member and configured to control the pressing member to change shape and press against the pressing member to deform the supporting member together with the flexible display unit.

20 Claims, 21 Drawing Sheets

(56) References Cited

U.S. PATENT DOCUMENTS

2014/0004906 A1* 1/2014 Chi .................... H04B 1/38
                                              455/566
2015/0325804 A1* 11/2015 Lindblad ................ H01L 51/52
                                              313/511

* cited by examiner (a)

(b)

PORTABLE ELECTRONIC DEVICE

CROSS-REFERENCE TO RELATED APPLICATION

Pursuant to 35 U.S.C. §119(a), this application claims the benefit of earlier filing date and right of priority to Korean Application No. 10-2014-0119228, filed on Sep. 5, 2014, the contents of which is incorporated by reference herein in its entirety.

BACKGROUND OF THE INVENTION

1. Field of the Invention

The present invention relates to a portable electronic device where at least part of a display unit is bendable or foldable, and a control method thereof.

2. Background of the Invention

A portable electronic device includes all types of devices provided with a battery and a display unit and carried by a user. The portable electronic device includes a device for recording and playing moving images, a device for displaying a graphic user interface (GUI), etc., which includes a notebook, a mobile phone, glasses, a watch, a game console, etc.

Such portable electronic device has become increasingly more functional. Examples of such functions include data and voice communications, capturing images and video via a camera, recording audio, playing music files via a speaker system, and displaying images and video on a display. Some portable electronic devices include additional functionality which supports game playing, while other portable electronic devices are configured as multimedia players. More recently, portable electronic devices have been configured to receive broadcast and multicast signals which permit viewing of content such as videos and television programs.

Some devices include a flexible display unit. However, the user interface for a flexible display unit is limited in nature and inconvenient to the user.

SUMMARY OF THE INVENTION

Therefore, one aspect of the present invention is to provide a portable electronic device having a novel type of body, by using characteristics of a flexible display unit which is bendable or foldable. More specifically, an aspect of the preset invention is to provide a portable electronic device having a body where a specific region of a flexible display unit is deformed in a convex or concaved manner.

Another aspect of the detailed description is to provide a portable electronic device capable of providing a user with information, by using a physical deformation of a flexible display unit which is bendable or foldable, and a control method thereof.

To achieve these and other advantages and in accordance with the purpose of this specification, as embodied and broadly described herein, the present invention provides a portable electronic device including a flexible display unit; an elastically-deformable supporting member disposed below the flexible display unit and configured to be deformed together with the flexible display unit; a pressing member disposed below the supporting member and configured to change shape; and a controller electrically-connected to the pressing member and configured to control the pressing member to change shape and press against the pressing member to deform the supporting member together with the flexible display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Portable electronic devices presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of portable electronic devices. However, such teachings apply equally to other types of terminals, such as those types noted above. In addition, these teachings may also be applied to stationary terminals such as digital TVs, desktop computers, a digital signage, and the like.

Figure 1:
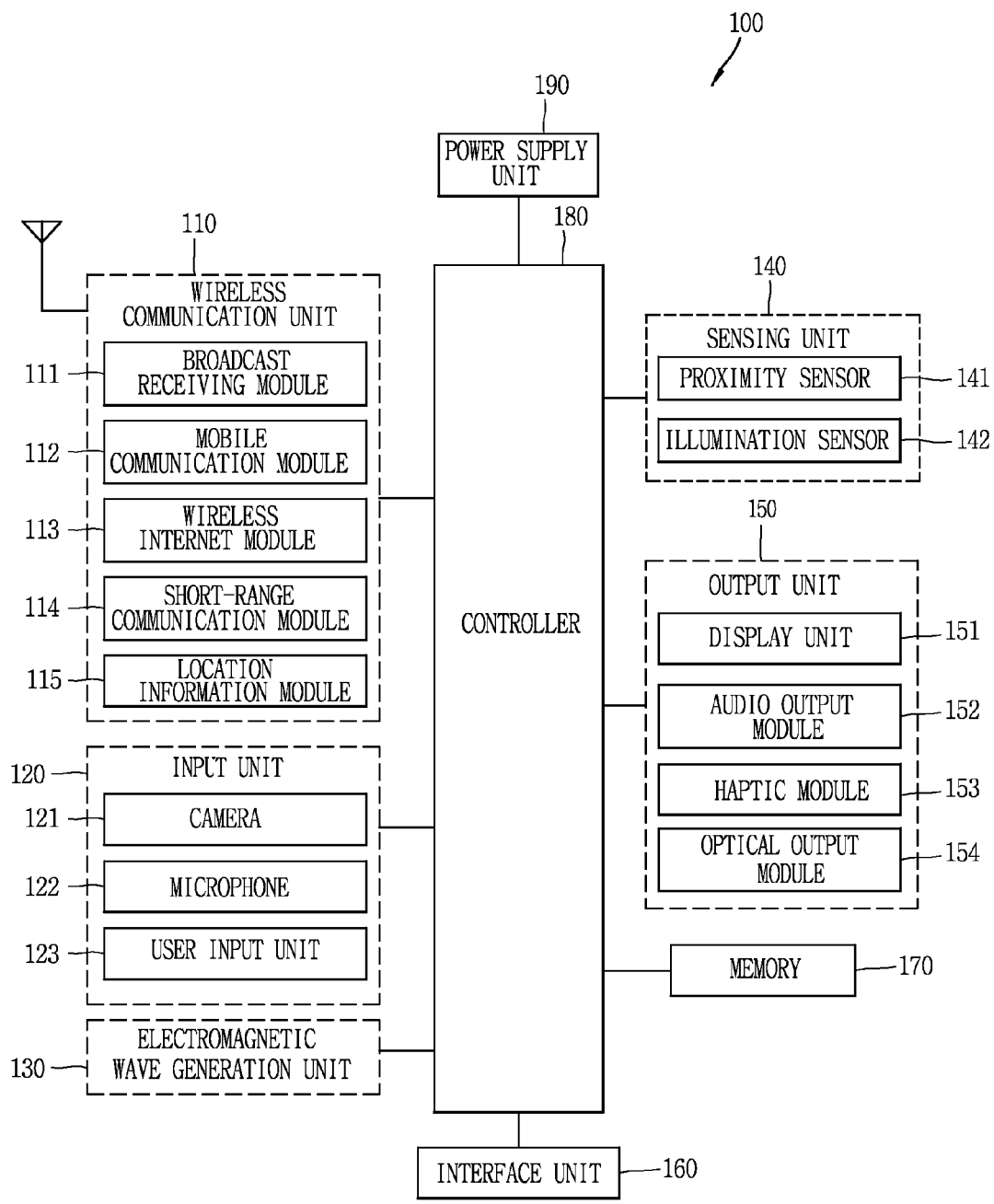
FIG. 1 is a block diagram illustrating a portable electronic device according to an embodiment of the present invention.

FIG. 1 is a block diagram of a portable electronic device according to an embodiment of the present invention. The portable electronic device 100 is shown having components such as a wireless communication unit 110, an input unit 120, an electromagnetic wave generation unit 130, a sensing unit 140, an output unit 150, an interface unit 160, a memory 170, a controller 180, and a power supply unit 190. Implementing all of the illustrated components is not a requirement, and greater or fewer components may alternatively be implemented.

Referring now to FIG. 1, the portable electronic device 100 is shown having the wireless communication unit 110 configured with several commonly implemented components. The wireless communication unit 110 typically includes one or more modules which permit communications such as wireless communications between the portable electronic device 100 and a wireless communication system, communications between the portable electronic device 100 and another portable electronic device, communications between the portable electronic device 100 and an external server. Further, the wireless communication unit 110 typically includes one or more modules which connect the portable electronic device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The electromagnetic wave generation unit 130 generates electromagnetic waves having a linear characteristic, as a trigger signal for controlling an external device positioned at a short distance. More specifically, the electromagnetic wave generation unit 130 generates electromagnetic waves having a specific frequency, under control of the controller 180. That is, electromagnetic waves generated by the electromagnetic wave generation unit 130 may have various frequencies under control of the controller 180. The electromagnetic waves may include various data for controlling an external device. More specifically, the electromagnetic waves may include a request message requesting information related to an external device, or an identifier for security.

The sensing unit 140 is typically implemented using one or more sensors configured to sense internal information of the portable electronic device, the surrounding environment of the portable electronic device, user information, and the like. For example, in FIG. 1, the sensing unit 140 includes a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The portable electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the portable electronic device 100 and a user, as well as function as the user input unit 123 which provides an input interface between the portable electronic device 100 and the user.

The display unit 151 is generally configured to output information processed in the portable electronic device 100. For example, the display unit 151 may display execution screen information of an application program executing at the portable electronic device 100 or user interface (UI) and graphic user interface (GUI) information in response to the execution screen information.

The display unit 151 outputs information processed in the portable electronic device 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The interface unit 160 serves as an interface with various types of external devices that can be coupled to the portable electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the portable electronic device 100 may perform assorted control functions associated with a connected external device, in response to the external device being connected to the interface unit 160.

The memory 170 is typically implemented to store data to support various functions or features of the portable electronic device 100. For instance, the memory 170 may be configured to store application programs executed in the portable electronic device 100, data or instructions for operations of the portable electronic device 100, and the like. Some of these application programs may be downloaded from an external server via wireless communication. Other application programs may be installed within the portable electronic device 100 at time of manufacturing or shipping, which is typically the case for basic functions of the portable electronic device 100 (for example, receiving a call, placing a call, receiving a message, sending a message, and the like). It is common for application programs to be stored in the memory 170, installed in the portable electronic device 100, and executed by the controller 180 to perform an operation (or function) for the portable electronic device 100.

The controller 180 typically functions to control overall operation of the portable electronic device 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the portable electronic device 100. The power supply unit 190 may include a battery, and the battery may be configured to be embedded in the body of the portable electronic device, or configured to be detachable from the body of the portable electronic device.

Referring still to FIG. 1, various components depicted in this figure will now be described in more detail. Regarding the wireless communication unit 110, the broadcast receiving module 11 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external portable electronic device, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the portable electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the portable electronic device 100 and a wireless communication system, communications between the portable electronic device 100 and another portable electronic device 100, or communications between the portable electronic device and a network where another portable electronic device 100 (or an external server) is located, via wireless area networks. One example of the wireless area networks is a wireless personal area networks.

In some embodiments, another portable electronic device (which may be configured similarly to portable electronic device 100) may be a wearable device, for example, a smart watch, a smart glass or a head mounted display (HMD), which can exchange data with the portable electronic device 100 (or otherwise cooperate with the portable electronic device 100). The short-range communication module 114 may sense or recognize the wearable device, and permit communication between the wearable device and the portable electronic device 100. In addition, when the sensed wearable device is a device which is authenticated to communicate with the portable electronic device 100, the controller 180, for example, may cause transmission of data processed in the portable electronic device 100 to the wearable device via the short-range communication module 114. Hence, a user of the wearable device may use the data processed in the portable electronic device 100 on the wearable device. For example, when a call is received in the portable electronic device 100, the user may answer the call using the wearable device. Also, when a message is received in the portable electronic device 100, the user can check the received message using the wearable device.

The location information module 115 is generally configured to detect, calculate, derive or otherwise identify a position of the portable electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the portable electronic device.

As one example, when the portable electronic device uses a GPS module, a position of the portable electronic device may be acquired using a signal sent from a GPS satellite. As another example, when the portable electronic device uses the Wi-Fi module, a position of the portable electronic device can be acquired based on information related to a wireless access point (AP) which transmits or receives a wireless signal to or from the Wi-Fi module.

The input unit 120 may be configured to permit various types of input to the portable electronic device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the portable electronic device 100. As another example, the cameras 121 may be located in a stereoscopic arrangement to acquire left and right images for implementing a stereoscopic image.

The microphone 122 is generally implemented to permit audio input to the portable electronic device 100. The audio input can be processed in various manners according to a function being executed in the portable electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the portable electronic device 100. The user input unit 123 may include one or more of a mechanical input element (for example, a key, a button located on a front and/or rear surface or a side surface of the portable electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the portable electronic device at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the portable electronic device, surrounding environment information of the portable electronic device, user information, or the like. The controller 180 generally cooperates with the sending unit 140 to control operation of the portable electronic device 100 or execute data processing, a function or an operation associated with an application program installed in the portable electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the portable electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the portable electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the portable electronic device 100 or a currently executed application program, for example.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense taps applied thereon, with a different activation period, according to an activated state or a deactivated state of the display unit 151.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. Further, if the display unit 151 is in a deactivated state (hereinafter, will be referred to as a doze mode), the touch sensor may be activated at preset periods.

When the preset period of the touch sensor is shorter, a sensing speed with respect to taps applied onto the display unit 151 is higher. However, in this instance, a power consumption amount of the touch sensor may be increased. Further, when the preset period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 is high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a 'KNOCK-KNOCK' touch input (first and second touch inputs consecutively applied onto a predetermined region within a reference time) is sensed by the touch sensor, the controller 180 can convert the doze mode into an activate mode where the display unit and the touch sensor are activated.

The touch sensor may be driven at a different period based on a state of the flexible display unit 151. For instance, when the flexible display unit 151 is in a closed state, a doze mode may be executed. Further, when a closed state is converted into an open state, an active mode may be executed.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by the illumination sensor 142 and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 121 is provided with at least one of a first camera 121a formed on a front surface of the body, and a second camera 121b formed on a rear surface of the body. The first camera 121a may process image frames of still pictures or video obtained by image sensors in a video or image capture mode. The processed image frames can be displayed on the display unit 151 or stored in memory 170.

The second camera 121b can include a plurality of lenses arranged along at least one line. The plurality of lenses may also be arranged in a matrix configuration. The camera may be referred to as an "array camera." When the second camera 121b is implemented as an array camera, images may be captured in various manners using the plurality of lenses and images with better qualities.

A flash is shown adjacent to the second camera 121b. When an image of a subject is captured with the camera 121b, the flash may illuminate the subject. In addition, the electromagnetic wave generation unit 130 may be disposed close to the second camera 121b. When the second camera 121b is activated, the electromagnetic wave generation unit emits generated electromagnetic waves.

The display unit 151 is generally configured to output information processed in the portable electronic device 100. For example, the display unit 151 may display execution screen information of an application program executing at the portable electronic device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the portable electronic device 100. The audio output module 152 may also be implemented as a receiver, a speaker, a buzzer, or the like.

The audio output module 152 includes at least one of a first audio output module 152a and a second audio output module 152b. The first audio output module 152a may be implemented in the form of a receiver, and the second audio output module 152b may be implemented in the form of a loud speaker to output voice audio, alarm sounds, multimedia audio reproduction, and the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the portable electronic device 100.

An optical output module 154 can output a signal for indicating an event generation using light of a light source. Examples of events generated in the portable electronic device 100 may include message reception, call signal reception, a missed call, an alarm, a schedule notice, an email reception, information reception through an application, and the like.

A signal output by the optical output module 154 may be implemented so the portable electronic device emits monochromatic light or light with a plurality of colors. The signal output may be terminated as the portable electronic device senses that a user has checked the generated event, for example.

The interface unit 160 serves as an interface for external devices to be connected with the portable electronic device 100. For example, the interface unit 160 can receive data transmitted from an external device, receive power to transfer to elements and components within the portable electronic device 100, or transmit internal data of the portable electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the portable electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the portable electronic device 100 via the interface unit 160.

When the portable electronic device 100 is connected with an external cradle, the interface unit 160 can serve as a passage to allow power from the cradle to be supplied to the portable electronic device 100 or may serve as a passage to allow various command signals input by the user from the cradle to be transferred to the portable electronic device therethrough. Various command signals or power input from the cradle may operate as signals for recognizing that the portable electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The portable electronic device 100 may also be operated in relation to a network storage device that performs the storage function of the memory 170 over a network, such as the Internet.

The controller 180 can typically control the general operations of the portable electronic device 100. For example, the controller 180 can set or release a lock state for restricting a user from inputting a control command with respect to applications when a status of the portable electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the portable electronic device 100. The power supply unit 190 may include a battery, which is typically rechargeable or be detachably coupled to the body of the portable electronic device for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the portable electronic device 100 can also be provided on the portable electronic device 100. As one example of an accessory, a cover or pouch for covering or accommodating at least one surface of the portable electronic device 100 may be provided. The cover or pouch may cooperate with the display unit 151 to extend the function of the portable electronic device 100. Another example of the accessory is a touch pen for assisting or extending a touch input to a touch screen.

Various embodiments described herein may be implemented in a computer-readable medium, a machine-readable medium, or similar medium using, for example, software, hardware, or any combination thereof.

Figure 2A:
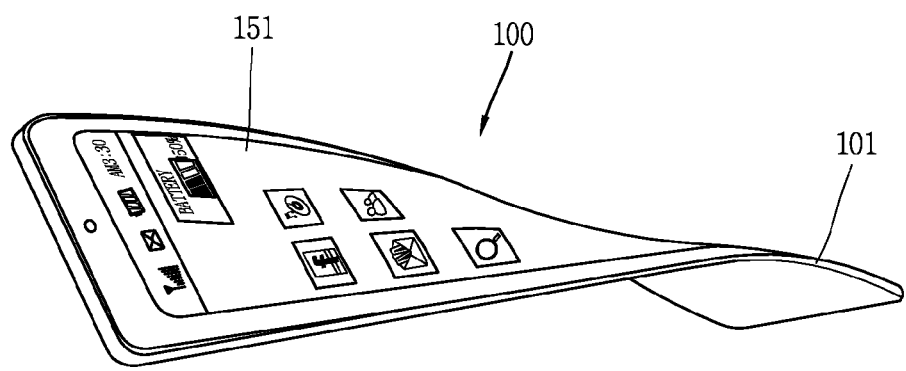
FIGS. 2A and 2B are conceptual views illustrating an example of a portable electronic device according to an embodiment of the present invention, which are viewed from different directions.

FIG. 2A illustrates a flexible portable electronic device 100 having a flexible display unit 151 and a case 101.

Figure 2B:
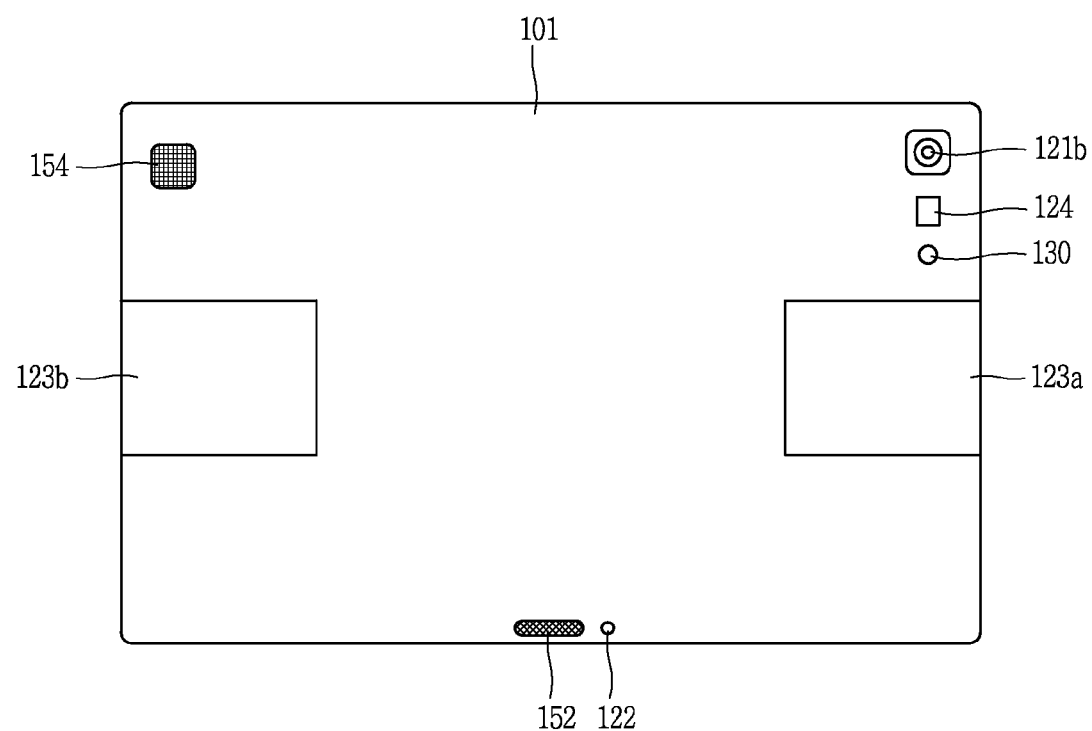

FIG. 2B illustrates a rear surface of the portable electronic device 100 having the second camera 121b, a flash 124, user inputs 123a and 123b, electromagnetic wave generation unit 130, audio output module 154 and microphone 122.

The portable electronic device 100 according to an embodiment of the present invention, which can include at least one of the above components, may be provided with a mechanism where at least part of the flexible display unit 151 is deformed in a concaved or convex manner. In this instance, the controller 180 can control functions of the portable electronic device 100 in correspondence to a shape change of the flexible display unit 151.

Hereinafter, a structure of the flexible display unit 151, and a method of controlling functions of the portable electronic device 100 in correspondence to a shape change of the flexible display unit 151, will be explained in more detail with reference to the attached drawings. First of all, an external feature of the flexible display unit 151 of the portable electronic device according to an embodiment of the present invention will be explained.

Figure 3A:
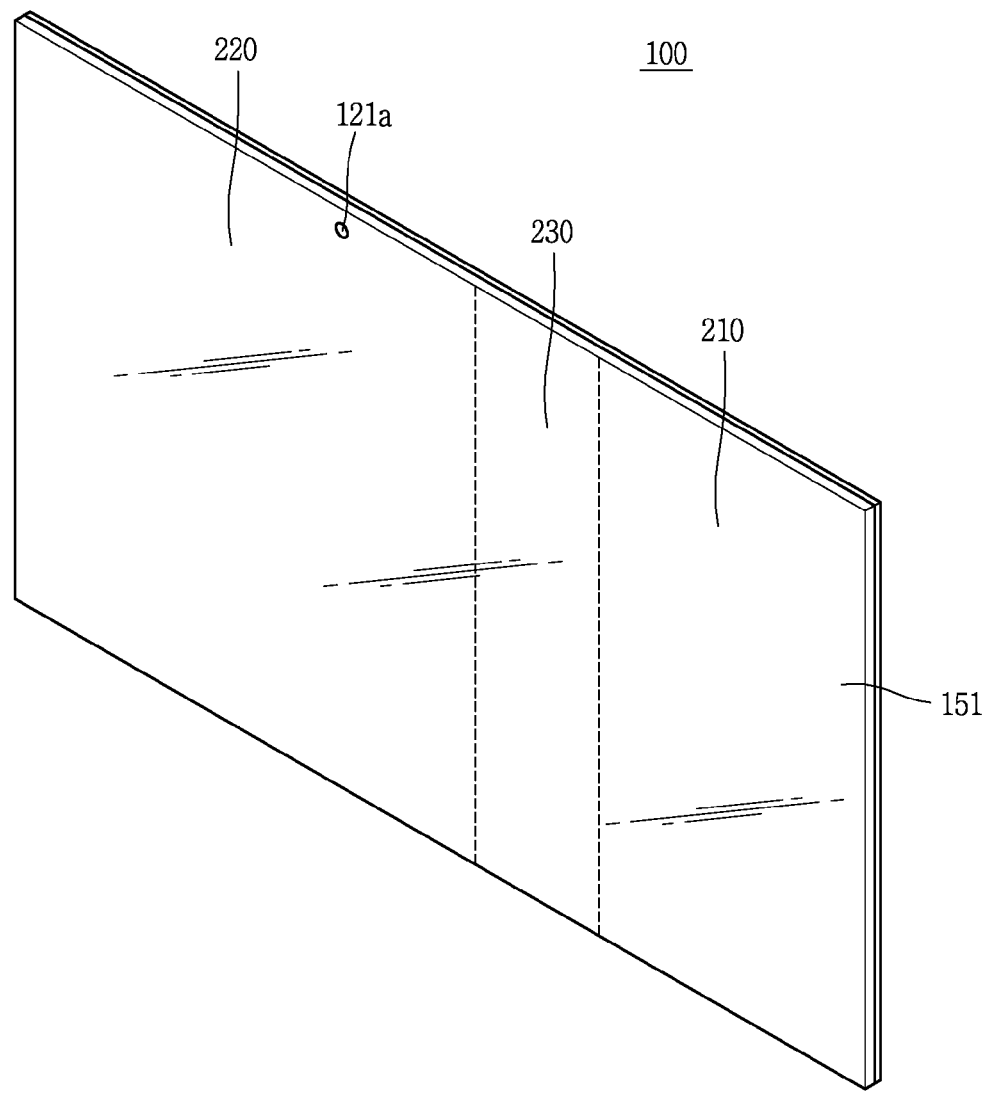
FIG. 3A is a front perspective view illustrating an example where a display unit forms a single flat surface, in a portable electronic device according to an embodiment of the present invention.

FIG. 3A is a front perspective view illustrating an example where a display unit forms a single flat surface in a portable electronic device according to an embodiment of the present invention, and FIGS. 3B to 3E are front perspective views illustrating various examples where at least part of a display unit is deformed in the portable electronic device of FIG. 3A.

Referring to FIGS. 3A to 3E, the portable electronic device 100 includes a case which forms appearance of the portable electronic device 100, a flexible display unit 151 disposed on a front surface of the portable electronic device 100, and a sensing unit 140 (refer to FIG. 1) configured sense a deformation of the flexible display unit 151. The flexible display unit 151 is formed to be bendable or foldable.

The folding of the display unit 151 means a curvature radius of part of a body of the portable electronic device is smaller than a reference value, i.e., a folded state. In the folded state of the portable electronic device, screens of the flexible display unit 151 contact each other or are positioned close to each other.

On the contrary, the bending of the display unit 151 means a curvature radius of part of the body of the portable electronic device is larger than the reference value, i.e., a bent state. The folding and bending may be differentiated from each other according to a bent degree. For instance, if the portable electronic device is bent at an angle larger than a predetermined value, the state may be defined as 'folding.' On the contrary, if the portable electronic device is bent at an angle equal to or smaller than the predetermined value, the state may be defined as 'bending.' Even if the portable electronic device is bent at an angle larger than a predetermined value, if a curvature radius is larger than the reference value, the state may be also defined as 'bending.'

Referring to FIGS. 3A to 3E, the portable electronic device can change forms from a single flat surface to at least part of the flexible display unit 151 being deformed. The deformed state corresponds to when a specific region of the flexible display unit 151 protrudes with at least a pair of points on the flexible display unit 151 being bent. That is, the flexible display unit 151 can be configured to be in a first state where a specific region is flat (refer to FIG. 3A), and a second state where the specific region is protruded (or recessed).

Figure 3B:
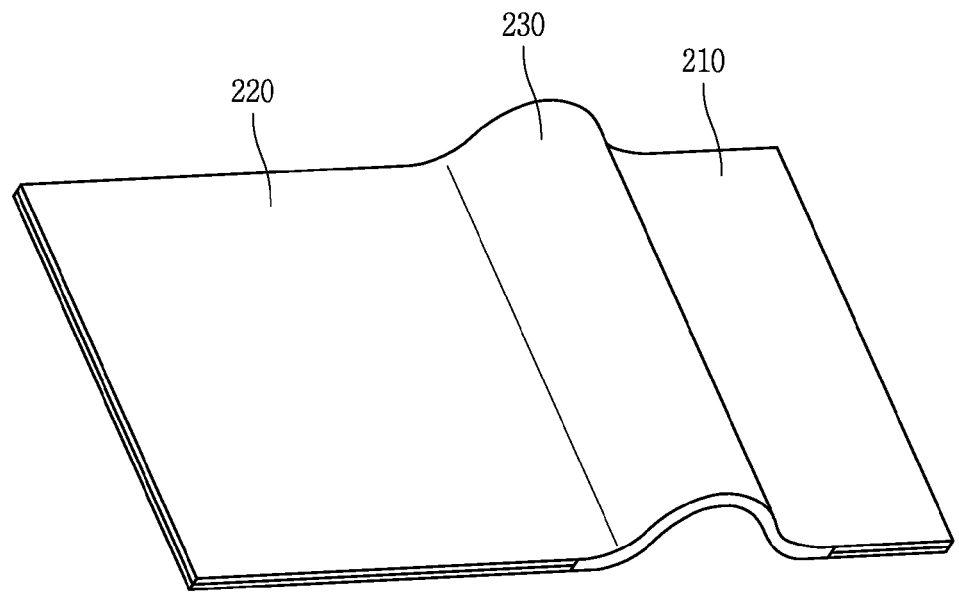
FIGS. 3B to 3E are front perspective views illustrating various examples where a specific region of a display unit is deformed, in the portable electronic device of FIG. 3A.

In this instance, the second state may be when a specific region 230 protrudes in a convex manner based on a front surface of the portable electronic device (refer to FIG. 3B). Referring to FIG. 3B, the flexible display unit 151 can include a first region 210 and a second region 220 divided from each other by the specific region 230. More specifically, the specific region 230 of the flexible display unit 151 can be a region disposed between the first region 210 and the second region 220. The first region 210 can be a region disposed at one side of the flexible display unit 151, and the second region 220 can be a region disposed at another side of the flexible display unit 151. The specific region 230 can be a central part of the flexible display unit 151, rather than an edge part. The specific region 230 may also be formed to be long in one direction, and may be configured so that an entire part thereof can be constantly deformed.

In this instance, the body of the portable electronic device may be entirely deformed together with the flexible display unit 151. Thus, part of a rear surface of the portable electronic device, which corresponds to the specific region, is deformed in a concaved manner. The portable electronic device can also be configured so that only the specific region 230 can be flexible. In this instance, the portable electronic device may be foldable based on the specific region, but the first region 210 and the second region 220 may not be flexible.

When the portable electronic device is entirely flexible, the specific region 230 may be preset as a predetermined region among an entire region of the body of the portable electronic device. The specific region 230 may not be a preset region, but an entire region of the portable electronic device.

Figure 3C:
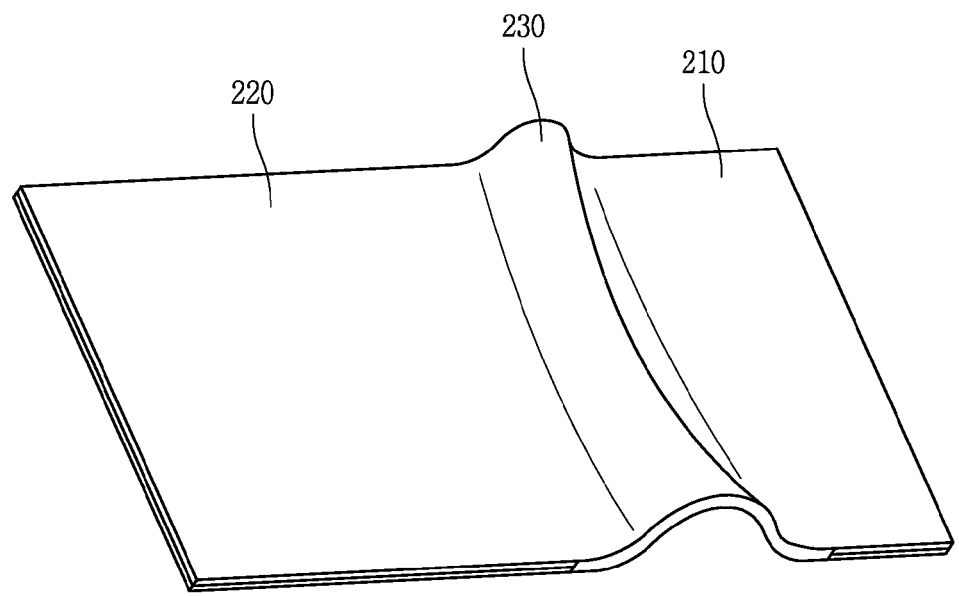

Referring to FIG. 3C, the specific region 230 of the portable electronic device can be deformed to have an irregular shape. Alternatively, referring to FIG. 3D, the specific region 230 of the portable electronic device can be deformed in a concaved manner, not in a convex manner based on a front surface of the flexible display unit 151.

Figure 3D:
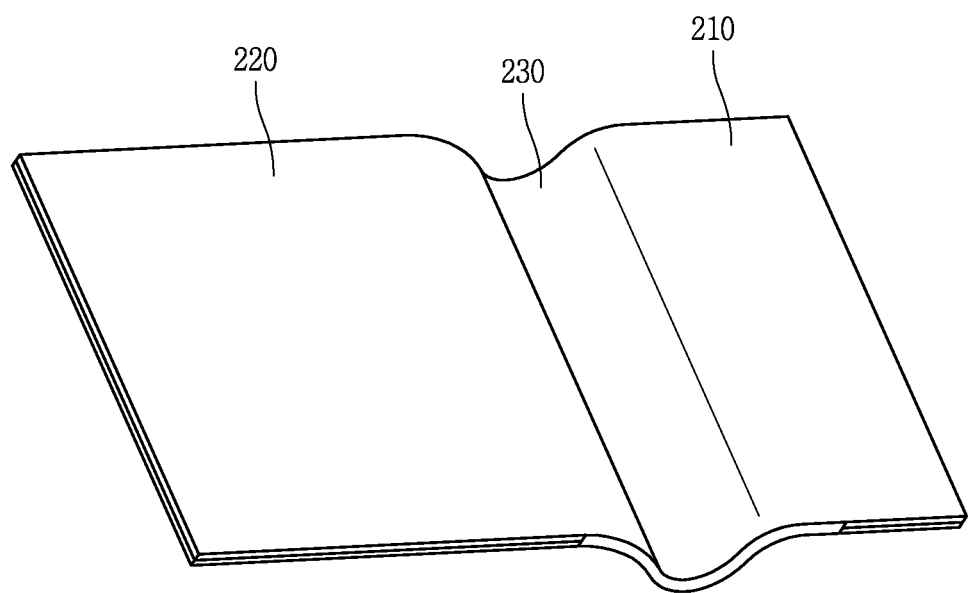
Figure 3E:
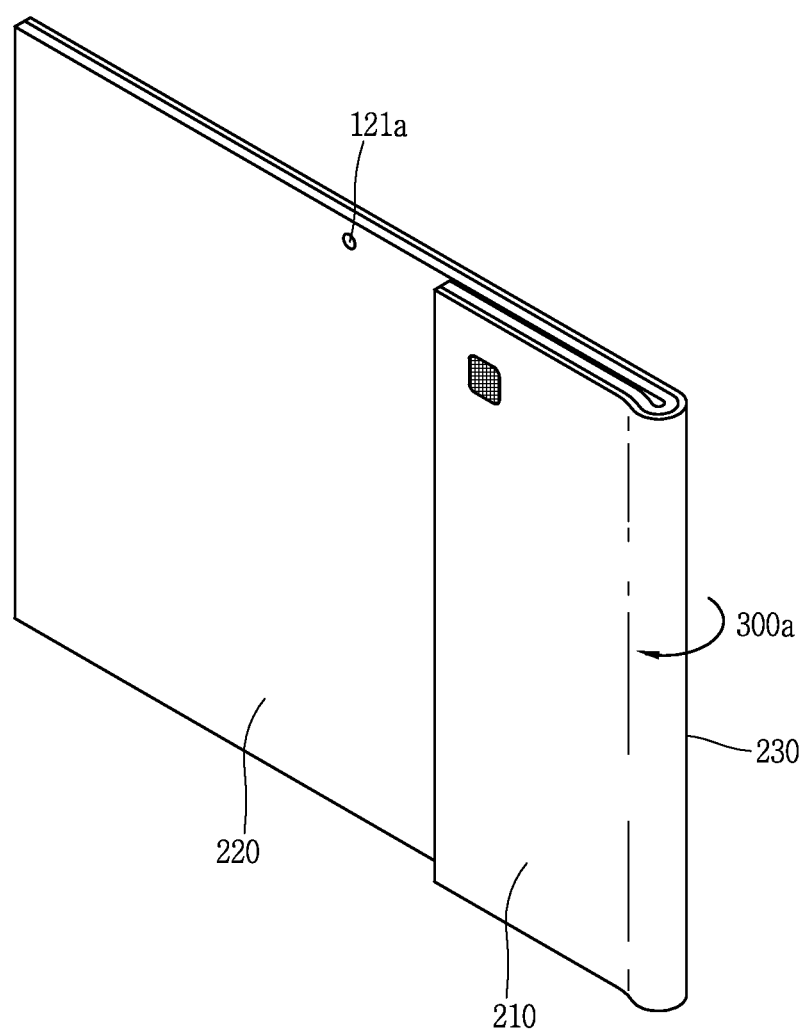

Referring to FIG. 3E, the portable electronic device can be configured to be foldable based on the specific region 230. That is, the flexible display unit 151 may be rotatable and bendable based on the specific region 230. For instance, a left end (first region) of the body of the portable electronic device may be bendable or deformed by being rotated in a first arrow direction 300a based on the specific region 230. In this instance, the first region and the second region can be folded on each other, which implements a foldable display. The flexible display unit 151 may also include a plurality of specific regions 230. In this instance, a left end and a right end of the portable electronic device may be folded respectively, thereby implementing a dual foldable display.

As aforementioned, in the portable electronic device of the present invention, a specific region of the flexible display unit is deformed in a concaved or convex manner. Hereinafter, a control operation related to deformation of such specific region, and a detailed mechanism will be explained. In more detail, an operation to control the portable electronic device when a specific region of the flexible display unit is deformed will be explained with reference to FIG. 4. In particular, FIG. 4 is a conceptual view illustrating a method of controlling a portable electronic device according to an embodiment of the present invention.

Figure 4:
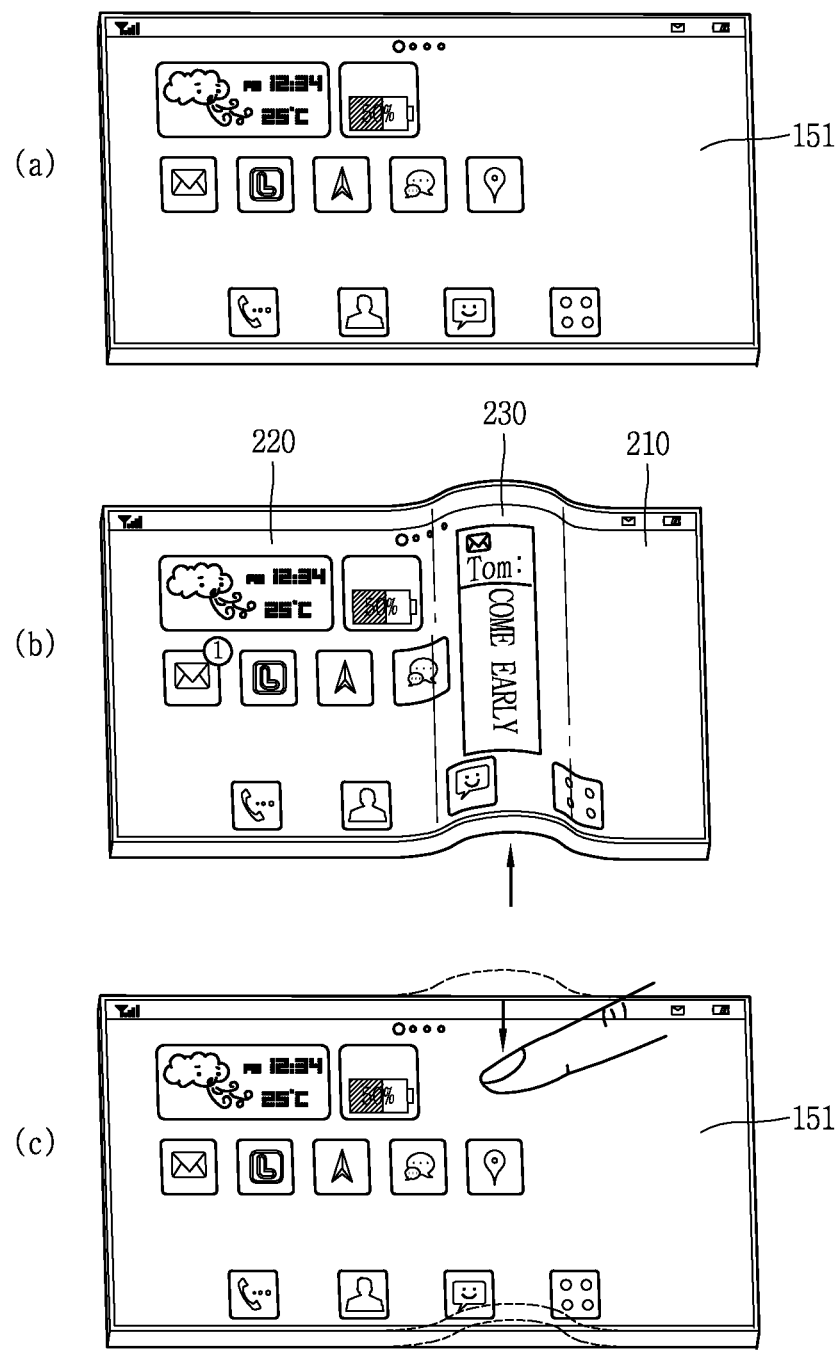
FIG. 4 is a conceptual view illustrating a method of controlling a portable electronic device according to an embodiment of the present invention.

Referring to FIG. 4, the flexible display unit 151 includes a first region 210, a second region 220 and a specific region 230. Referring to FIG. 4(*a*), a home screen page is displayed on the flexible display unit 151. The home screen page may include at least one object such as an icon or widget of an application installed at the portable electronic device. In FIG. 4(*a*), the home screen page is displayed on the first region 210, the second region 220 and the specific region 230. However, the present invention is not limited to this. That is, the first region 210 and the second region 220, where different types of information is displayed, may be divided from each other according to different types of graphic user interfaces (GUIs).

If an event occurs from at least one application, the controller 180 outputs information indicating the event to the specific region 230 (refer to FIG. 4(*b*)). However, the home screen page displayed on the flexible display unit 151 is merely exemplary. A graphic user interface (GUI) of an application being currently executed is output to the flexible display unit 151, and the event may occur in this state. The controller 180 controls the specific region 230 to be protruded in a convex manner based on a front surface of the portable electronic device. In this embodiment, the information indicating the event is information indicating reception of a text message, which may be content of a short text message.

In this instance, the controller 180 senses a state conversion of the flexible display unit 151 using the sensing unit 140. If the flexible display unit 151 returns to the first state from the second state as an external force is applied thereto, the sensing unit 140 senses such deformation of the flexible display unit 151. As aforementioned, the first state may be a state where specific region of the flexible display unit 151 is flat, and the second state may be a state where the specific region is protruded (or recessed).

The deformation of the flexible display unit 151 may occur by an external force applied to the flexible display unit 151. The external force may be applied by a user or an object. Once the sensing unit 140 senses a state conversion from the second state to the first state, the controller 180 controls output of event-related information based on such sensing.

More specifically, referring to FIG. 4(*c*), if a specific region protruded in a convex manner becomes flat by a user's pressure, the controller 180 determines that a text message has been checked. In this instance, content of a text message may be displayed on a screen of the specific region for a predetermined time, and then disappear. As another example, content of an output message may gradually disappear by a user's push input. Under such configuration, when an event occurs from the portable electronic device, a user can recognize the occurred event more easily.

Figure 5:
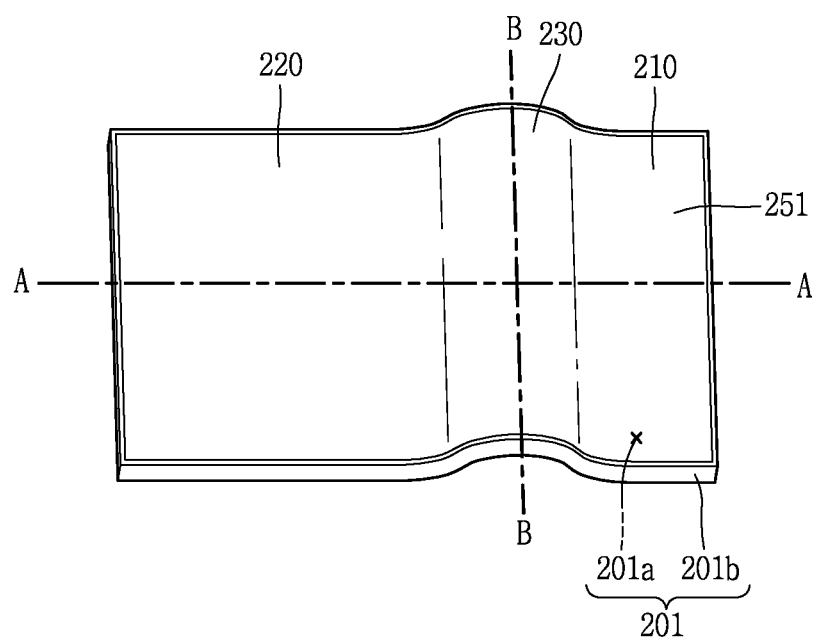
FIG. 5 is a perspective view of a portable electronic device according to an embodiment of the present invention.
Figure 6:
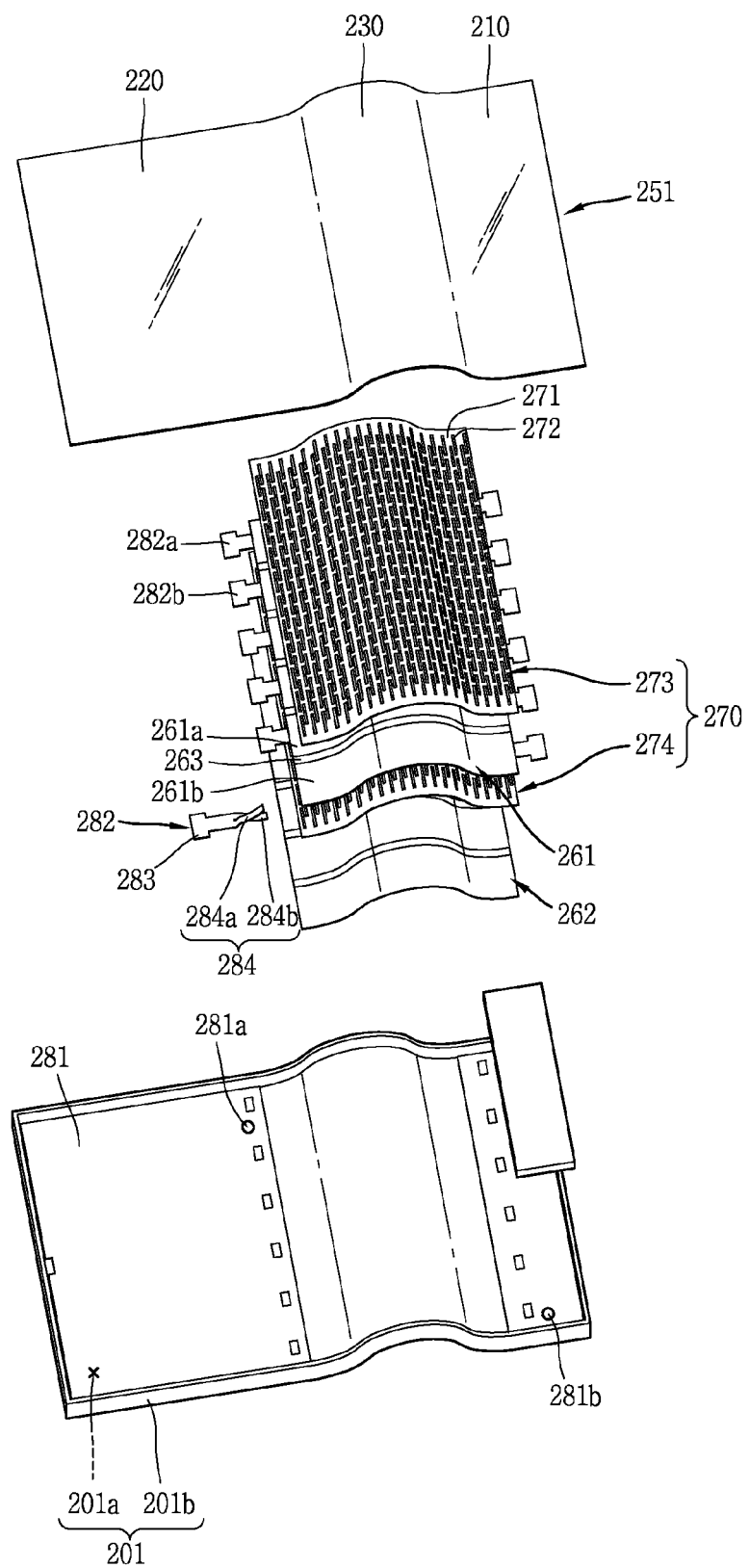
FIG. 6 is an exploded perspective view of the portable electronic device of FIG. 5.
Figure 7A:
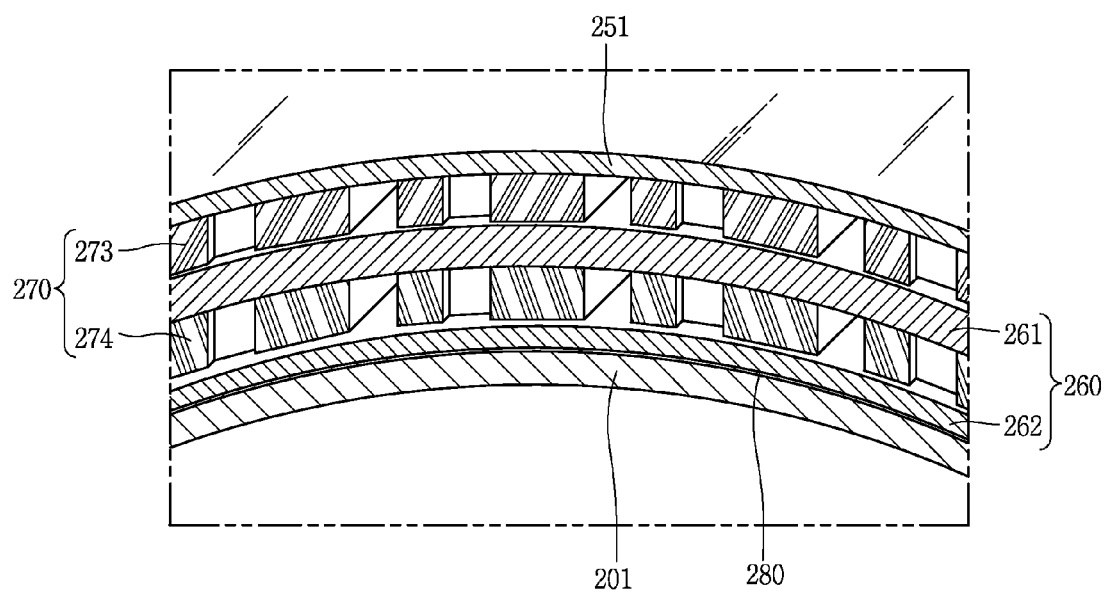
FIGS. 7A and 7B are sectional views taken along line 'A-A' and 'B-B' in FIG. 5, respectively.
Figure 7B:
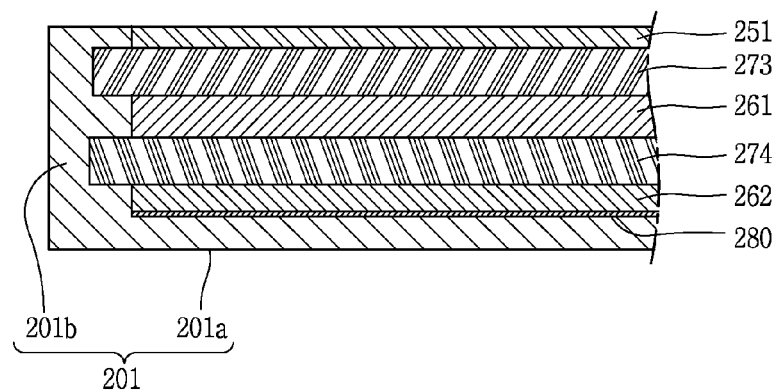
Figure 7C:
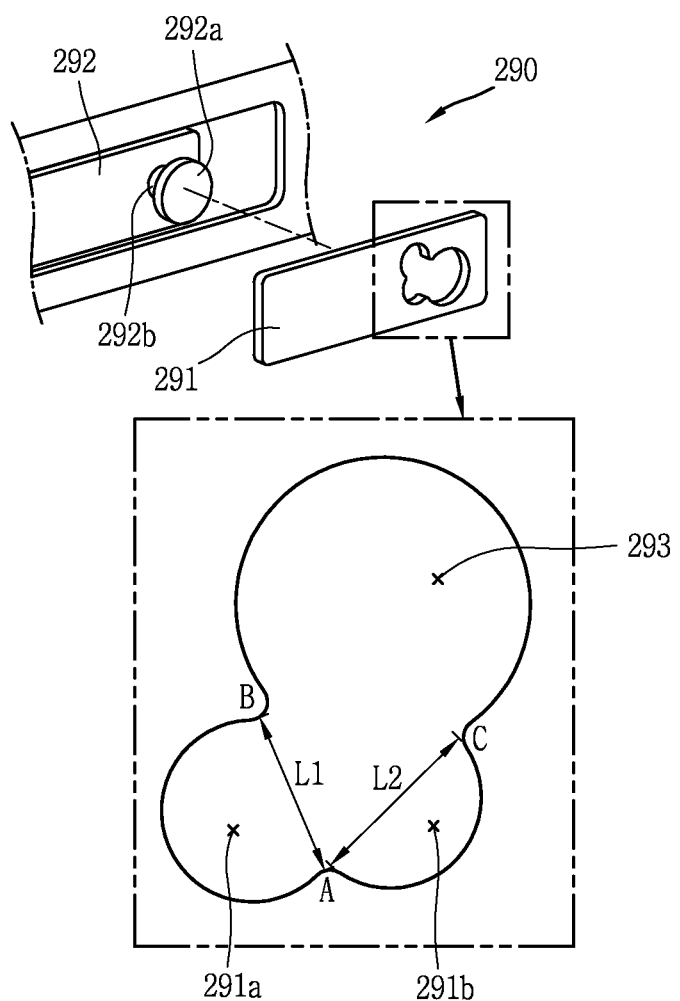
FIG. 7C is an enlarged view of locking holes of FIG. 6.

Hereinafter, a hardware configuration of the portable electronic device which performs the operations of FIG. 4 will be explained in more detail. In particular, FIG. 5 is a perspective view of a portable electronic device according to an embodiment of the present invention, FIG. 6 is an exploded perspective view of the portable electronic device of FIG. 5, FIGS. 7A and 7B are sectional views taken along line 'A-A' and 'B-B' in FIG. 5, respectively, and FIG. 7C is an enlarged view of locking holes of FIG. 6.

Referring to FIGS. 5 to 7C, the body of the portable electronic device is provided with a front surface, a rear surface and side surfaces. A flexible display unit 251 is disposed on the front surface, and a case is disposed on the rear surface. The case may be a rear cover 201 which forms a rear surface of the body. In this embodiment, the flexible display unit 251 is mounted to the rear cover 201, and the rear cover 201 is formed to be flexible so as to be deformable by an external force. That is, in this embodiment, the flexible display unit 251 and the rear cover 201 are combined to each other to form a space where electronic components are mounted. The rear cover 201 is also formed to be flexible so that the portable electronic device can be bent or folded with maintaining its thickness. For this, the rear cover 201 may include a first part 201a corresponding to a rear surface of the body, and a second part 201b protruding from an edge of the first part 201a.

The rear cover 201 may be formed of a deformable material such as plastic, thin glass, fiber, thin metal (e.g., aluminum), textile, silicone or rubber, or a combination thereof. Further, the rear cover 201 may be formed of a transmissive and flexible material such as polyethylene terephthalate (PET) film and thin glass. In this instance, the flexible display unit 251 may be a display unit having an optical transmittance. Information output to the flexible display unit 251 may be exposed to outside even from a rear surface of the portable electronic device, through the rear cover 201.

However, the present invention is not limited to this. The case may be further provided with another cover rather than the rear cover, or cases. For instance, a front case which forms at least part of a front surface of the body, and a rear case which forms at least part of a rear surface of the body can be coupled to each other, thereby forming a space where electronic components are mounted. The rear cover for covering mounted electronic components may be detachably coupled to the rear case.

As shown, electronic components may be mounted to the rear cover. For instance, a detachable battery, an identification module, a memory card, etc. may be mounted to the rear cover 201. An opening, through which the camera 121 and the audio output unit 154 (refer to FIG. 2B) are exposed to outside, may be provided at the rear cover 201.

One or plural rear input units 123a and 123b (refer to FIG. 2B) may be provided at a rear surface of the portable electronic device. The rear input units 123a and 123b are configured to receive a command for controlling an operation of the portable electronic device 100, and content to be input may be variously set. For instance, the rear input units may be configured to receive a touch input, a push input or a combination thereof. In conclusion, the rear input units may be configured to receive both a touch input and a push input. In some cases, the rear input units may serve as a touch sensor of the flexible display unit 251, and a home key of the portable electronic device.

The rear input units may be disposed at positions close to right and left ends of the portable electronic device. Under such configuration, in a folded state of the portable electronic device, the rear input unit positioned on at least one rear surface may be positioned on a front surface.

The flexible display unit 251 may include a flexible display device such as a plastic OLED display and a micro LED display. In addition, the display device can be covered by an additional window. For instance, the window may be formed of a transmissive and flexible material, such as a polyethylene terephthalate (PET) film or thin glass. However, the window may include a non-transmissive region. A transmissive region of the window may have an area corresponding to the display device. Accordingly, a user can recognize visual information output from the display unit 251 from outside.

A touch sensor configured to sense a touch input applied to the window may be disposed between the window and the display device. For instance, the touch sensor may be mounted to a rear surface of the window. In this instance, the touch sensor is additionally provided. As another example, the touch sensor may be integrally provided with the display device. In this instance, the display device may be a touch-sensible display device.

The touch sensor may be formed to be transmissive, and is configured to convert change occurring from a specific part of the window (e.g., a voltage and a capacitance) into an electrical input signal so as to sense a touch input. Further, the touch sensor may be also configured to sense not only a touched position and a touched area, but also touch pressure and/or touch capacitance. The window, the touch sensor, and the display device may be configured as the flexible display unit 251. In this instance, the flexible display unit 251 is operated as a flexible touch screen.

Referring to the drawings, a first member 260, configured to press at least part of the flexible display unit 251, is disposed on a rear surface of the flexible display unit 251. The first member 260 is arranged so as to be covered by the flexible display unit 251, and is configured to be deformable by a temperature change. That is, the first member 260 is arranged to apply a force to the specific region 230 of the flexible display unit 251 by deformation. Since the first member 260 is configured to press the specific region 230, it is referred to as a pressing member 260.

More specifically, the pressing member 260 is formed of a shape memory alloy configured to return to the original shape by remembering a shape at a specific temperature. For instance, the pressing member 260 is configured to be deformed from a flat shape to a convex shape, when a first temperature is changed into a second temperature by a supplied current. That is, the pressing member 260 is configured to have a flat shape at a first temperature, and to have a convex shape at a second temperature. In this instance, the pressing member 260 is disposed below the flexible display unit 251, and applies a force to the specific region 230 of the flexible display unit 251 when deformed into a convex shape.

The portable electronic device may be in the aforementioned first state in a sleep mode or a doze mode, and may be in the aforementioned second state in an active mode converted due to occurrence of an event, etc. The controller 180 can control the pressing member 260 not to operate in the first state. For this, the first temperature may be a room temperature, and the second temperature may be a temperature higher than the first temperature.

The controller 180 is electrically connected to the pressing member 260 so as to control the pressing member 260.

More specifically, the controller 180 is formed to control a current supplied to the pressing member 260, and a temperature of the pressing member 260 is changeable according to whether or not a current has been supplied to the pressing member 260.

As shown, a printed circuit board (PCB) 281 can be configured as an example of the controller 180 for performing various functions of the portable electronic device. Various types of electronic devices, etc. may be mounted to the PCB 281. In this instance, the PCB 281 is implemented as a flexible PCB which can be bent or folded together with the display unit, and is disposed below the flexible display unit 251. The PCB 281 is formed to be spaced from the pressing member 260, in a direction parallel to a front surface of the flexible display unit 251. A connection member 282, which is protruded from the PCB 281 so as to be electrically connected to the pressing member 260, is disposed at one side of the PCB 281. If the portable electronic device is configured so that only the specific region 230 can be flexible, the PCB 281 may be a hard PCB whereas the connection member 282 may be a flexible PCB.

The connection member 282 is provided with a part 283 connected to the PCB 281, and a part 284 connected to the pressing member 260. The part 284 connected to the pressing member 260 may be formed in plurality so that a single PCB can be connected to a plurality of pressing members. That is, the part 284 connected to the pressing member 260 may be diverged from the part 283 connected to the PCB 281, and be provided with a first connection part 284a and a second connection part 284b.

As shown, end portions of the first connection part 284a and the second connection part 284b are formed to have a height difference therebetween, in a thickness direction of the portable electronic device. Under such configuration, the pressing member 260 may be provided in plurality, and the plurality of pressing members 260 can be disposed to overlap each other. That is, the aforementioned pressing member 260 may be one of a plurality of pressing members, and the plurality of pressing members may be provided with a first pressing member 261 and a second pressing member 262. The first and second pressing members 261 and 262 are disposed to overlap each other, and are electrically connected to the first and second connection parts 284a and 284b, respectively.

The first and second pressing members 261 and 262 may be formed of the same type of shape memory alloy. In this instance, the controller 180 can control a deformation rate of the first and second pressing members 261 and 262, by controlling the amount of current applied to the first and second pressing members 261 and 262. Accordingly, the first and second pressing members 261 and 262 can be controlled at the same temperature in the same manner, or be differently controlled at different temperatures. If a plate member is bent, a deformation rate of the first and second pressing members 261 and 262 due to the bending is variable in a thickness direction of the portable electronic device. In this embodiment, a deformation rate of the first and second pressing members 261 and 262 is controlled in an overlapped state between the first and second pressing members 261 and 262. Thus, a designer can compensate for a difference of deformation rates due to bending. However, the present invention is not limited to this. For instance, the controller 180 can supply the same amount of current to the first and second pressing members 261 and 262, despite a difference of deformation rates.

As another example, the first and second pressing members 261 and 262 may be formed of the same type of shape memory alloy with different thicknesses. Alternatively, the first and second pressing members 261 and 262 may be formed of different types of shape memory alloys. In this instance, even if the controller 180 supplies the same amount of current to the first and second pressing members 261 and 262 in order to control deformation rates of the first and second pressing members 261 and 262, the first and second pressing members 261 and 262 can have different deformation rates.

The first and second pressing members 261 and 262 may include shape memory alloy members 261a and 261b, respectively, the shape memory alloy members spaced from each other in a direction parallel to the flexible display unit. The shape memory alloy members 261a and 261b may be formed of the same type of shape memory alloy. Alternatively, the shape memory alloy members 261a and 261b may be formed of different type of shape memory alloys.

In this instance, an insulator 263 can be disposed between the shape memory alloy members 261a and 261b. The insulator 263 is formed of a flexible material such as rubber. As shown, the shape memory alloy members 261a and 261b can be individually controlled by the controller 180. For electrical connection between the PCB 281 and the pressing member 260, a plurality of connection members 282a and 282b protrude from the PCB 281.

Under such structure, a specific region is divided into a plurality of regions, and each divided region can individually undergo a temperature control through a different current amount. As each region undergoes a different temperature control, a deformation can be implemented.

Temperature sensors 281a and 281b configured to sense a temperature of the pressing member 260 can be mounted to the PCB 281. For instance, a first temperature sensor 281a and a second temperature sensor 281b can be disposed at two sides of the pressing member 260. The amount of current supplied to the pressing member 260, or a supply time duration can be determined based on a temperature of the pressing member 260 sensed by the first temperature sensor 281a and the second temperature sensor 281b. The first temperature sensor 281a and the second temperature sensor 281b can be disposed at two ends of the portable electronic device in a lengthwise direction. More specifically, the first temperature sensor 281a and the second temperature sensor 281b may be disposed at two points farthest from each other in a diagonal direction of the pressing member 260.

In addition, not only the pressing member 260 but also a supporting member 270 may be disposed below the flexible display unit 251. The supporting member 270 is formed to be elastically deformable together with at least part of the flexible display unit 261, by an external force applied from the pressing member 260. The supporting member 270 is disposed to support at least part of the flexible display unit 251. The supporting member 270 includes a body 271 formed as a metallic plate. The body 271 may be formed of aluminum or stainless steel.

A plurality of slits 272 are formed on one surface of the body 271. The plurality of slits 272 form repeated patterns on the one surface of the body 271. The plurality of slits 272 may be through holes which penetrate the body 271. More specifically, polygonal through patterns are formed at a metallic plate, and thereby a flexibly-movable hinge is implemented. The through patterns may be formed by a laser processing when the body is formed of aluminum, and formed by a press processing when the body is formed of stainless steel.

The plurality of slits 272 may be long formed in a lengthwise direction of the portable electronic device. In this instance, the lengthwise direction refers to a direction to extend along a shorter side between horizontal and vertical sides of the portable electronic device. Further, a widthwise direction refers to a direction to extend along a longer side between horizontal and vertical sides of the portable electronic device.

As shown in FIG. 6, the plurality of slits 272 can be arranged to cross each other in three or more columns. More specifically, a plurality of slits in each column are spaced from each other in a lengthwise direction. In this instance, slits are disposed at different positions, in columns adjacent to each other in a widthwise direction. For instance, slits formed in each column have the same length, and slits formed in one column are partially overlapped with slits formed in an adjacent column in a widthwise direction. Such pattern of the slits can provide flexibility to the supporting member, and provide rigidity to maintain a deformed state of the portable electronic device in a constantly convex manner, in a lengthwise direction of the portable electronic device.

Referring to FIGS. 5, 6 and 7A~7C, the supporting member 270 is one of a plurality of supporting members, and the plurality of supporting members are disposed to overlap each other. In this instance, at least one of the pressing members is disposed between the supporting members. For instance, the plurality of supporting members may include a first supporting member 273 and a second supporting member 274.

More specifically, the first supporting member 273 can be disposed between the flexible display unit 251 and the first pressing member 261, and the second supporting member 274 can be disposed between the first pressing member 261 and the second pressing member 262. Under such structure, the first pressing member 261 lifts the first supporting member 273, and the second pressing member 262 lifts the second supporting member 274. Each of the first and second supporting members 273 and 274 may be coupled to the second part 201b of the rear cover 201, at its two edges. Under such structure, once the first and second supporting members 273 and 274 are lifted to be deformed, the rear cover is also deformed.

A deformation rate occurring due to bending of the portable electronic device may become different in a thickness direction. However, a specific region may be deformed in a convex manner, despite a difference of deformation rates. More specifically, once the first and second pressing members 261 and 262 apply forces to the first and second supporting members 273 and 274 by being deformed, the first supporting member 273 is stretched to have an increased length, whereas the second supporting member 274 is contracted to have a decreased length. For such flexible structure, the supporting member 270 may have a pattern as aforementioned. The supporting member 270 can also maintain a deformed state of the first and second pressing members 261 and 262.

One of the plurality of supporting members may be formed of a material having a lower rigidity than that of another. For instance, the second supporting member 274 is formed of a material having a lower rigidity than that of the first supporting member 273. Accordingly, a specific region can be moved more flexibly when bent.

As another example, one of the plurality of supporting members may be provided with slits of a preset pattern, and another thereof may be provided with slits of a pattern different from the preset pattern. In this instance, the first and second supporting members 273 and 274 may be formed of the same material. For instance, slits of the first supporting member 273 may be formed to have a shorter length than slits of the second supporting member 274. Hereinafter, a pattern formed by the slits of the first supporting member 273 is referred to as 'a first through pattern,' and a pattern formed by the slits of the second supporting member 274 is referred to as 'a second through pattern.'

The controller 180 can determine a state of the portable electronic device among the aforementioned states using at least one sensing unit 140 (refer to FIG. 1). The sensing unit 140 may include a proximity sensor, an IR sensor, a magnetic sensor and an illumination sensor, and may sense a relative position of the specific region with respect to the first region or the second region. The sensing unit 140 is provided with a plurality of sensors, and the controller 180 determines a state of the body of the portable electronic device based on information received from the plurality of sensors.

As another example, the sensing unit 140 may include a bend sensor disposed on one of a front surface and a rear surface of the flexible display unit 151 or on both of them, the bend sensor configured to sense a bent state of the flexible display unit 151. The bend sensor means a sensor formed to be bendable and configured to sense a bent state using a characteristic that a resistance value is variable according to a bent degree. For instance, the bend sensor may be implemented as an optical fiber bending sensor using a deformation rate of optical fiber, an electric resistance type bending sensor using an electric resistance, a pressure sensor, a strain gauge, etc. The sensing unit 140 may calculate a resistance value of the bend sensor based on a size of a voltage applied to the bend sensor, or a size of a current flowing on the bend sensor. Then the sensing unit 140 can sense a bending-occurred position, a bending degree, etc. based on the calculated resistance value.

The controller 180 determines a state of the portable electronic device using the sensing unit 140, and controls information output to the flexible display unit 251 according to a result of the determination. Once the first and second pressing members 261 and 262 are deformed, the controller 180 stops current supply to the first and second pressing members 261 and 262. Thereafter, the first and second pressing members 261 and 262 have lowered temperatures by radiation, and a restoration force is applied to the first and second pressing members 261 and 262. For the radiation, a radiating sheet 280 may be provided. For instance, the supporting member 270 may be disposed on one surface of the pressing member 260, and the radiating sheet 280 for radiating heat may be disposed on another surface of the pressing member 260. More specifically, the radiating sheet 280 may be disposed below the second pressing member 262, and the radiating sheet 280 formed of a graphite material may be configured to cover the second pressing member 262.

In addition, the portable electronic device is provided with a locking module 290 configured to maintain a second state where a specific region has been deformed in a convex manner, against a restoration force. The locking module 290 is configured to lock a deformed state of at least part of the flexible display unit so as to maintain the deformed state, even if an external force applied from the pressing member has been removed.

For instance, in response to a call signal received in a first state, the controller 180 can convert the portable electronic device into a second state. In this instance, if a user has not attempted a call connection, the controller 180 can control the second state to be maintained for a predetermined time, such that the user recognizes an unchecked call (missed call). If the controller 180 continuously supplies a current to the portable electronic device for maintenance of the second state, power loss occurs. To solve such problem, the portable electronic device includes the locking module 290.

As shown, the locking module 290 includes a first locking member 291 having locking holes 291*a* and 291*b* and a second locking member 291, and a protrusion 292*a* inserted into the locking holes 291*a* and 291*b*. The first locking member 291 and the second locking member 292 are disposed at two edges of a specific region. Alternatively, a pair of first and second locking members 291 and 292 may be disposed at the two edges in a symmetric manner.

The locking holes 291*a* and 291*b* of the first locking member 291 are formed to overlap each other partially or wholly. A locking jaw, configured to restrict the protrusion 292*a* from moving from one of the locking holes 291*a* and 291*b* to another, may be provided. More specifically, in a first state, the first and second locking members 291 and 292 are positioned such that the protrusion 292*a* is in a fitted state into the second locking hole 291*b*. The fitted state of the protrusion 292*a* into the second locking hole 291*b* may be fixed by the locking jaw. While a first state is converted into a second state, the protrusion 292*a* passes through the locking jaw. After the state conversion, the protrusion 292*a* is completely moved to the first locking hole 291*a*.

For such movement, a through hole 293 is provided at one side of the locking holes 291*a* and 291*b*. The through hole 293 may overlap part of the locking holes 291*a* and 291*b*. More specifically, a distance (L1) from a point (A) where the first and second locking holes 291*a* and 291*b* meet with each other to a point (B) where the first locking hole 291*a* meets with the through hole 293 is shorter than a distance (L2). The distance (L2) is from the point (A) to a point (C) where the second locking hole 291*b* meets with the through hole 293. Under such structure, the protrusion 292*a* can easily pass through the locking jaw when the portable electronic device is converted from a first state to a second state. However, a force more than a predetermined level is required for the protrusion 292*a* to pass through the locking jaw, when the portable electronic device is converted from the second state to the first state.

Under such structure of the locking module 290, a mechanism where a second state is converted into a first state only when a user pushes a specific region is implemented. That is, even if current supply to the pressing member is stopped, a deformed state of the supporting member 270 is maintained in a second state by the locking module 290. In this instance, if a user presses the portable electronic device, the second state is converted into the first state.

In addition, a circumference groove 292*b* formed on an outer circumferential surface of the protrusion 292*a* is configured to be locked by the locking holes 291*a* and 291*b*. The protrusion 292*a* is formed to have a larger diameter than the locking holes 291*a* and 291*b*. For an insertion space of the protrusion 292*a* during an assembly process, the through hole 293 can have a larger diameter than the locking holes 291*a* and 291*b*.

The portable electronic device may include a sensing unit activated in a state where at least part of the flexible display unit is deformed in a convex manner. The sensing unit is configured to sense a push input applied to the flexible display unit. For instance, the sensing unit may be a dome switch, a piezoelectric switch or the like, each disposed below a radiating sheet. Under such structure, if a user presses the portable electronic device while a deformed state of the supporting member is maintained by the locking module, a second state is converted into a first state. In this instance, a dome switch, a piezoelectric switch or the like, is pressed by the radiating sheet 280, thereby generating a signal. Then the controller 180 receives the signal, and senses that the portable electronic device has returned to the first state by a user input. If the second state is maintained for notification of the aforementioned unchecked call, the controller 180 can convert the aforementioned unchecked call into a checked call, based on the sensing.

One embodiment of the present invention provides a mechanism where a specific region of the flexible display unit is deformed in a convex manner, and then a user input is applied to the specific region. Alternatively, when a specific region is deformed in a convex manner as shown in FIGS. 5, 6 and 7A~7C, the portable electronic device can sense other type of user input applied to the specific region. For instance, the portable electronic device is configured to sense a force applied in a direction perpendicular to a direction to push the specific region. More specifically, the sensing unit of the portable electronic device can sense an input to pinch or squeeze the specific region. For this, an IR sensor configured to sense a user's pinching motion may be mounted to two edges of the specific region. As a modification example, a squeeze sensor configured to sense a user input to squeeze the specific region may be attached to the specific region.

The description above described the pressing member is deformed in a convex manner by current supply, and then returns to the original state (flat state) when radiating by current disconnection. However, the present invention is not limited to this. For instance, the pressing member may be configured to be deformable into a convex shape from a flat shape as its temperature is increased, and to return to the flat shape from the convex shape by a push pressure. That is, the pressing member may be formed of a shape memory alloy configured to be deformable to a flat shape when pushed at a room temperature, and to return to the original shape (convex shape) when its temperature is increased by heat.

In addition, the above description describes a hardware configuration of the portable electronic device where a specific region is deformed in a convex manner and then returns to a flat state. However, the hardware configuration may be variously modified. Hereinafter, such modification example will be explained.

Figure 8A:
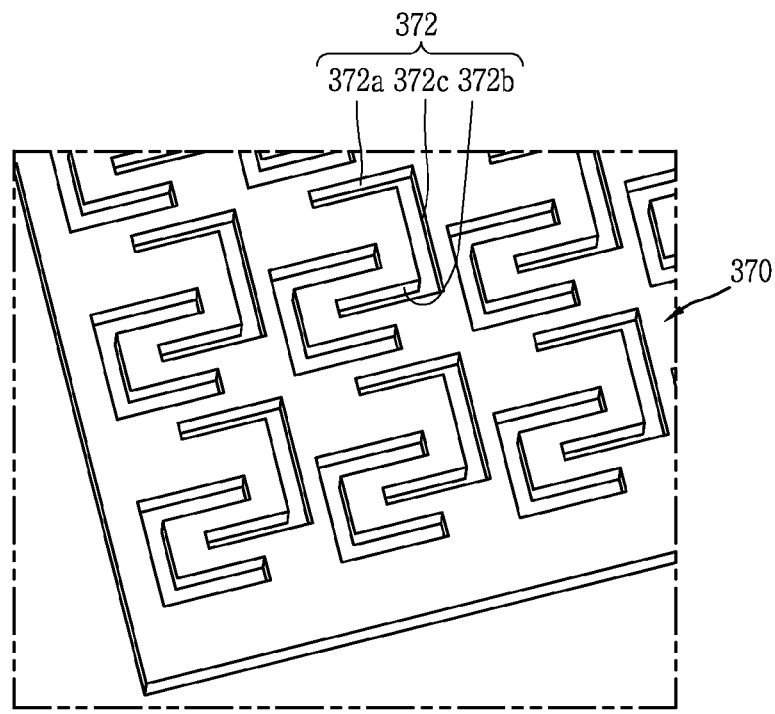
FIGS. 8A and 8B are planar views illustrating modification examples of a supporting member of FIG. 6.
Figure 8B:
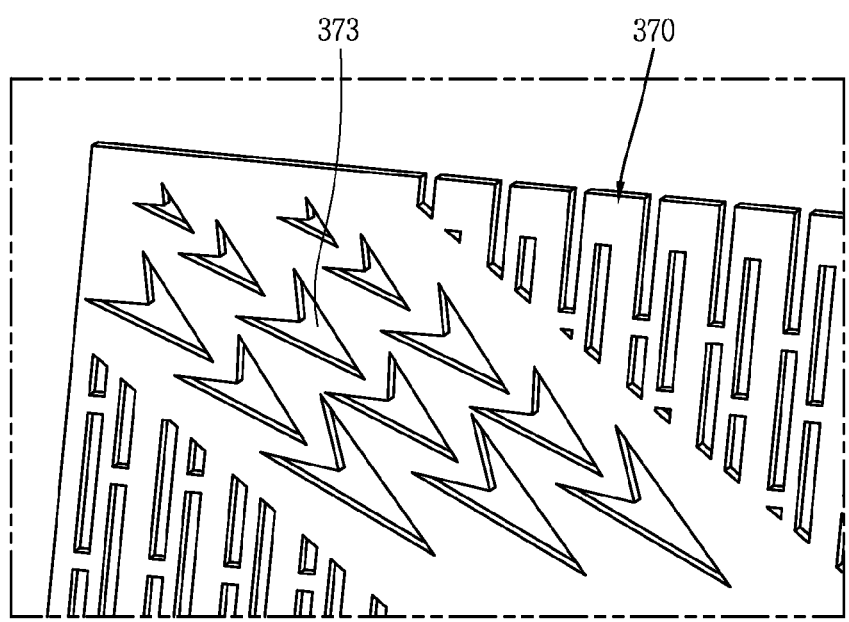
Figure 9A:
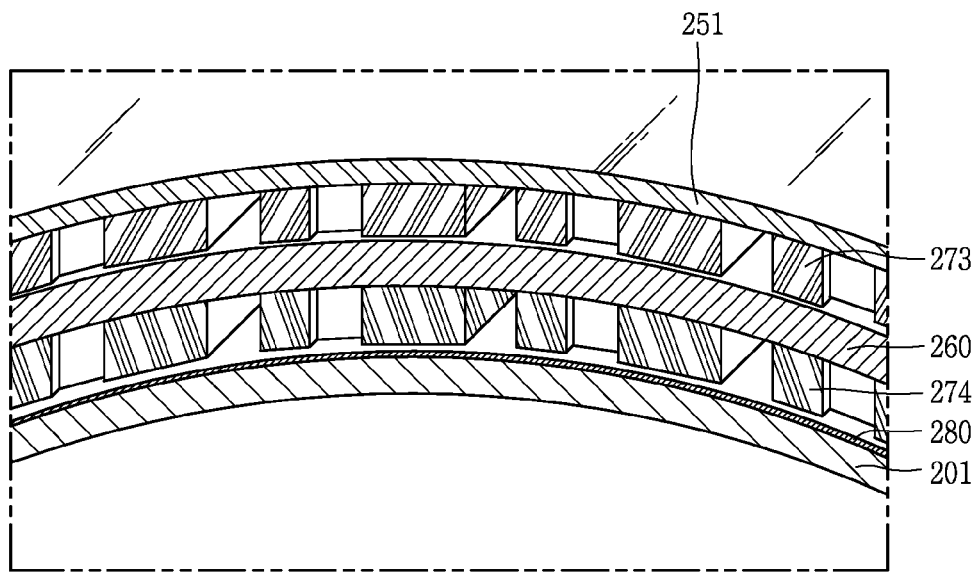
FIGS. 9A and 9B are sectional views illustrating modification examples of the portable electronic device of FIG. 5.
Figure 9B:
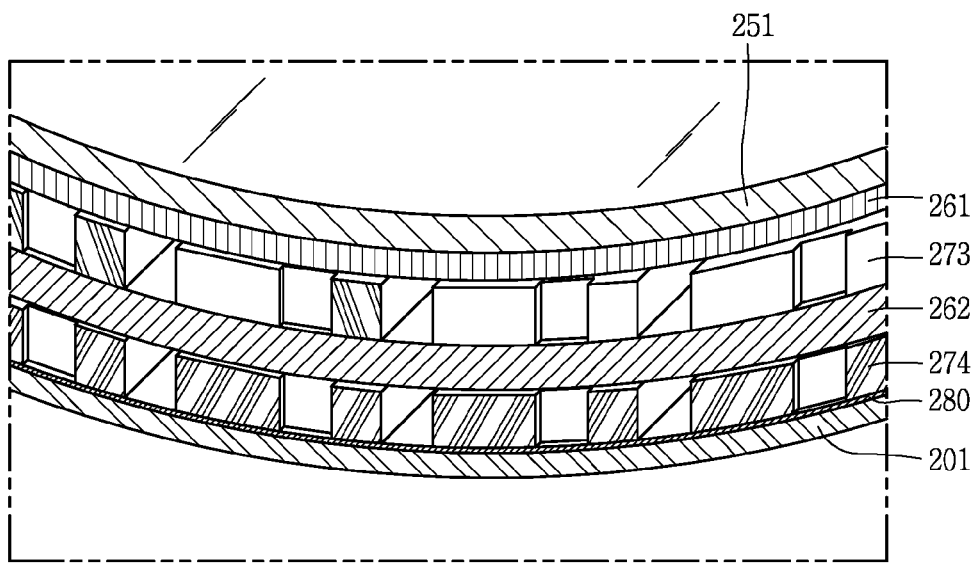

In particular, FIGS. 8A and 8B are planar views illustrating modification examples of the supporting member of FIG. 6, and FIGS. 9A and 9B are sectional views illustrating modification examples of the portable electronic device of FIG. 5. Referring to FIG. 8A, through patterns formed at the supporting member have various shapes, such that the supporting member maintains its deformed shape while moving flexibly. As shown in FIG. 8A, a slit 372 is formed in a lengthwise direction of the portable electronic device, and includes a first slit part 372*a*, a second slit part 372*b*, and a connection part 372*c*. The first and second parts 372*a* and 372*b* are spaced from each other in a widthwise direction, and the connection part 372*c* is configured to connect the first and second parts 372*a* and 372*b* to each other. In this instance, the connection part 372*c* is formed in a widthwise direction, and is connected to end portions of the first and second slit parts 372*a* and 372*b*. Under such configuration, the slit 372 is formed in a 'U'-shape having a recessed central portion.

As shown, a pair of slits in one column are disposed so that recessed portions thereof face each other. In this instance, the through patterns may be implemented so that the pair of slits are repeatedly formed in one column, and the column is repeatedly formed in a widthwise direction. Hereinafter, the pattern formed by the slits in FIG. 8A will be referred to as 'a third through pattern.'

Referring to FIG. 8B, two or more patterns among patterns including at least one of the first to third through patterns may be formed at the supporting member. For instance, as the flexible display unit is folded in various directions and not in a single direction, two or more multi patterns may be applied to the supporting member for implementation of various shapes. In this instance, fourth through patterns 373 may be formed at the supporting member 370 in a diagonal direction. The fourth through patterns 373 have a larger size toward a central region of the supporting member 370 from an edge region of the supporting member 370. In this embodiment, the fourth through patterns 373 are arranged together with the first through patterns.

The supporting member which has been explained with reference to FIGS. 8A and 8B may be replaced by at least one of the first and second supporting members aforementioned with reference to FIGS. 5, 6 and 7A~7C. A structure of the supporting member has been aforementioned with reference to FIGS. 5, 6 and 7A~7C, and thus its detailed explanations will not be made.

Referring to FIGS. 9A and 9B, a laminated structure of the supporting member and the pressing member may be modified in various manners. Referring to FIG. 9A, a pressing member 260 is disposed between a plurality of supporting members. For instance, the plurality of supporting members include first and second supporting members 273 and 274, and the pressing member 260 is disposed between the first and second supporting members 273 and 274.

More specifically, the first supporting member 273 is disposed below the flexible display unit 251, and the pressing member 260 is disposed below the first supporting member 273. In addition, the second supporting member 274 is disposed below the pressing member 260, and a radiating sheet 280 and a rear cover 201 are sequentially disposed below the second supporting member 274.

Each of the first and second supporting members 273 and 274 may be implemented so that one of the aforementioned first to fourth through patterns and multi pattern can be formed at a body formed of a metallic material. In this instance, the pressing member 260 lifts the first supporting member 273, while a force is not directly applied to the second supporting member 274. The second supporting member 274 may be adhered to the pressing member 260 so as to be provided with a force. Alternatively, at least one of two ends of the second supporting member 274 may be coupled to at least one of two ends of the pressing member 260.

Referring to FIG. 9B, a flexible display unit 251 is configured so as to be convertible from a first state where a specific region 230 (refer to FIG. 5) is flat, to a second state where the specific region 230 is recessed. That is, the second state is where the specific region 230 is concaved from a front surface of the portable electronic device.

Referring to the drawings, a body of the portable electronic device includes a front surface, a rear surface and side surfaces. The flexible display unit 251 is disposed on the front surface, and a case is disposed on the rear surface. The case may be the rear cover 201 which forms the rear surface of the body. In this embodiment, the flexible display unit 251 is mounted to the rear cover 201, and the rear cover 201 is formed to be flexible so as to be deformable by an external force.

The flexible display unit 251 may include a flexible display device such as a plastic OLED display or a micro LED display. Further, the display device may be covered by an additional window. For instance, the window is formed of a transmissive and flexible material, such as a polyethylene terephthalate (PET) film or thin glass. The flexible display unit 251 may be provided with a touch sensor configured to sense a touch input applied to the window. The touch sensor may be additionally provided to be mounted to a rear surface of the window, or may be integrally formed with the display device. In this instance, the flexible display unit 251 is operated as a flexible touch screen.

In addition, a pressing member 261 configured to press at least part of the flexible display unit 251 is disposed on a rear surface of the flexible display unit 251. The pressing member 261 is arranged to be covered by the flexible display unit 251, and is formed to be deformable by a temperature change.

More specifically, the pressing member 261 is formed of a shape memory alloy material configured to return to the original shape by remembering a shape at a specific temperature. For instance, the pressing member 261 is configured to be deformable to a concaved shape from a flat shape, when a first temperature is changed into a second temperature by current supply. Also, the pressing member 261 is configured to be deformable to the flat shape from the concaved shape, when the second temperature is changed into the first temperature by radiation. In addition, the pressing member 261 is disposed below the flexible display unit 251, and applies a force to the specific region 230 of the flexible display unit 251 when deformed into a concaved shape.

As shown, a supporting member 273 may be disposed below the pressing member 261. Under such structure, the pressing member 261 downwardly pushes the supporting member 273. The supporting member 273 is configured to be deformable together with at least part of the flexible display unit 251 by an external force provided from the pressing member 261.

Like the supporting member aforementioned with reference to FIGS. 5, 6 and 7A~7C, the supporting member 273 is implemented so that a plurality of slits are formed on one surface of a body formed as a metallic plate. The plurality of slits may form one of the aforementioned first to fourth through patterns and multi patterns.

As shown, besides the pressing member 261 and the supporting member 273, a pressing member and a supporting member may be additionally provided. In this instance, the pressing member 261 is one of a plurality of pressing members, which may be the first pressing member 261. The supporting member 273 is one of a plurality of supporting members, which may be the first supporting member 273.

More specifically, the first supporting member 273 may be disposed between the first and second pressing members 261 and 262, and a second supporting member 274 may be disposed below the second pressing member 262. Under such structure, the first pressing member 261 downward pushes the first supporting member 273, and the second pressing member 262 downward pushes the second supporting member 274.

Further, controller 180 is electrically connected to the first and second pressing members 261 and 262 so as to control the first and second pressing members 261 and 262. More specifically, the controller 180 is configured to control current supply to the first and second pressing members 261 and 262, and a temperature of the first and second pressing members 261 and 262 is changed according to the current supply.

The first and second pressing members 261 and 262 may be formed of the same type of shape memory alloy. In this instance, the controller 180 can control a deformation rate of the first and second pressing members 261 and 262 by controlling the amount of current supplied to the first and second pressing members 261 and 262. As another example, the first and second pressing members 261 and 262 may be formed of the same type of shape memory alloy with different thicknesses. Alternatively, the first and second pressing members 261 and 262 may be formed of different types of shape memory alloys.

One of the plurality of supporting members may be formed of a material having a lower rigidity than that of another. For instance, the first supporting member 273 is formed of a material having a lower rigidity than that of the second supporting member 274. Accordingly, a specific region can be moved more flexibly when bent in a concaved manner.

As another example, one of the plurality of supporting members may be provided with slits of a preset pattern, and another thereof may be provided with slits of a pattern different from the preset pattern. In this instance, the first and second supporting members 273 and 274 may be formed of the same material. For instance, slits of the first supporting member 273 may be formed to have a longer length than slits of the second supporting member 274.

Once the first and second pressing members 261 and 262 are deformed, the controller 180 stops current supply to the first and second pressing members 261 and 262. Thereafter, the first and second pressing members 261 and 262 have a lowered temperature by radiation, and a restoration force is applied to the first and second pressing members 261 and 262. For the radiation, the radiating sheet 280 for radiating heat may be provided.

The portable electronic device is provided with a locking module configured to maintain a second state where a specific region has been deformed in a concaved manner, against a restoration force. The locking module may have the same structure as the locking module aforementioned with reference to FIGS. 5, 6 and 7A~7C, and detailed explanations thereof will be omitted.

Under such structure, a mechanism, where a specific region of the flexible display unit is deformed in a concaved manner is implemented. In the mechanism where the specific region is deformed in a concaved or convex manner, the pressing member may be implemented in a different manner. Hereinafter, an example to implement the pressing member in a different manner will be explained with reference to FIGS. 10 and 11.

Figure 10:
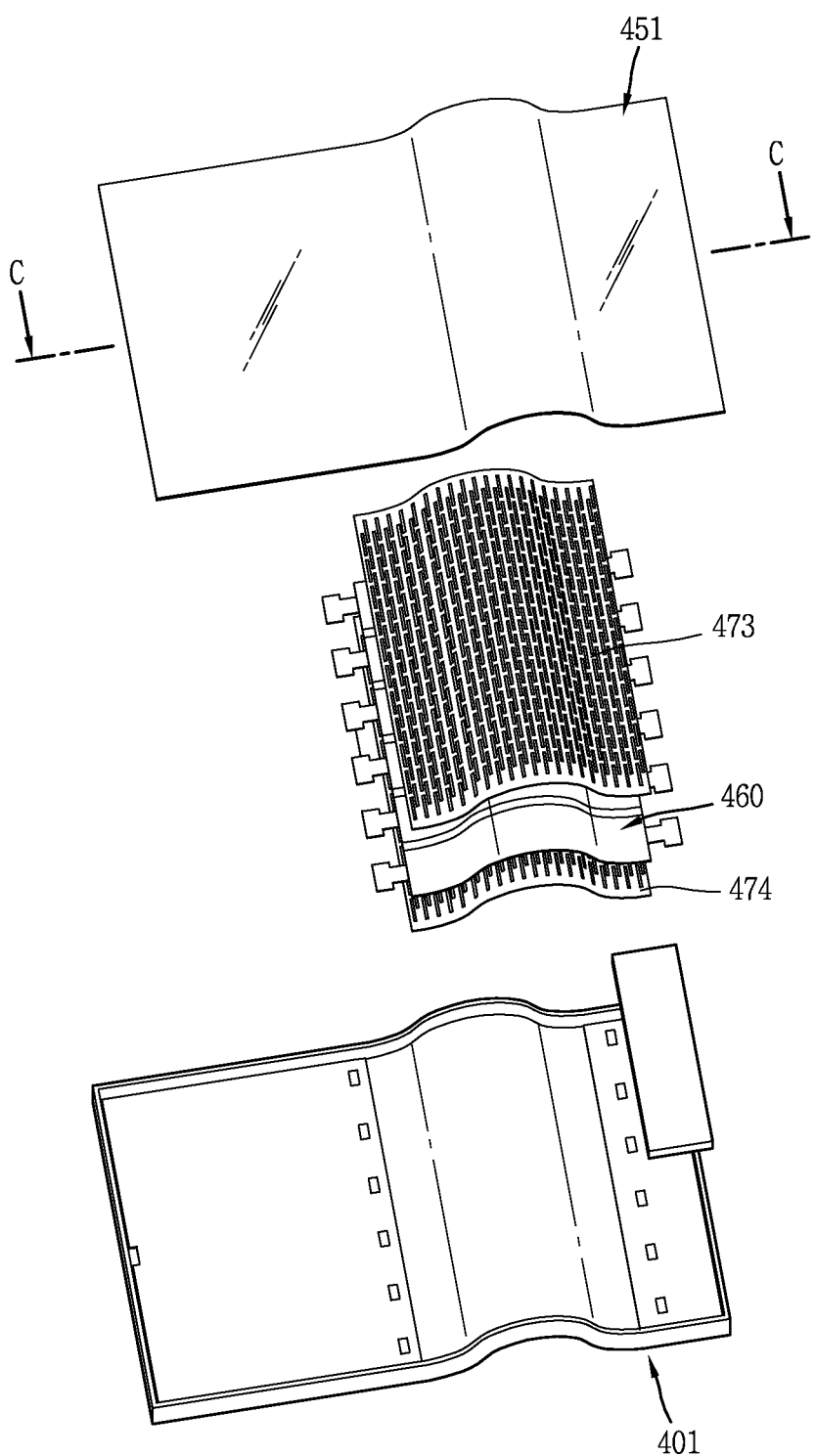
FIG. 10 is an exploded perspective view of a portable electronic device according to another embodiment of the present invention.
Figure 11:
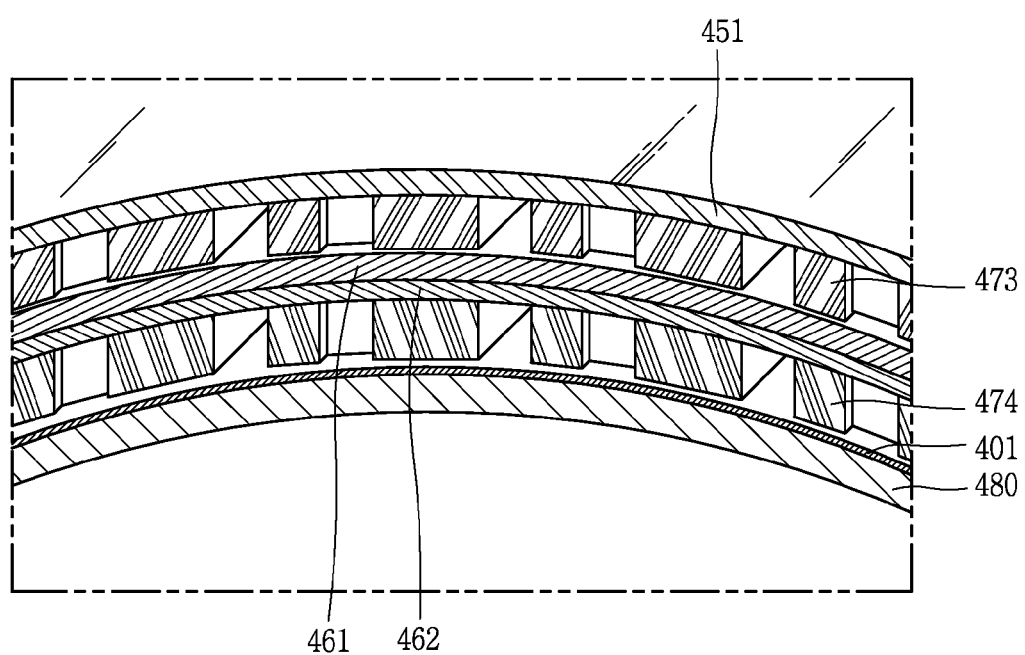
FIG. 11 is a sectional view taken along line 'C-C' in FIG. 10.

FIG. 10 is an exploded perspective view of a portable electronic device according to another embodiment of the present invention, and FIG. 11 is a sectional view taken along line 'C-C' in FIG. 10. Referring to the drawings, the portable electronic device includes a flexible display unit 451, a pressing member 460, a controller 180 (refer to FIG. 1), a supporting member 470 and a rear cover 401. The portable electronic device further includes a radiating sheet 480. In this instance, the components except for the pressing member will not be explained, because they have the same structure or function as that of the components aforementioned with reference to FIGS. 5, 6 and 7A~7C.

As shown, a single pressing member is disposed between a plurality of supporting members. For instance, the plurality of supporting members include a first supporting member 473 and a second supporting member 474, and the pressing member 460 is disposed between the first and second supporting members 473 and 474.

More specifically, the first supporting member 473 is disposed below the flexible display unit 451, and the pressing member 460 is disposed below the first supporting member 473. In addition, the second supporting member 474 is disposed below the pressing member 460, and a radiating sheet 480 and a rear cover 401 are sequentially disposed below the second supporting member 474. Each of the first and second supporting members 473 and 474 may be implemented so that one of the aforementioned first to fourth through patterns and multi patterns can be formed at a body formed of a metallic material.

In this instance, the pressing member 460 lifts the first supporting member 473 while a force is not directly applied to the second supporting member 474. The second supporting member 474 may be adhered to the pressing member 460 so as to be provided with a force. Alternatively, at least one of two ends of the second supporting member 474 may be coupled to at least one of two ends of the pressing member 460.

The pressing member 460 is configured to have a convex shape by being bent to one direction at a specific temperature. More specifically, the pressing member 460 may include a first layer 461 and a second layer 462 so as to be bent when heated. The second layer 462 is laminated on the first layer 461, and is formed of a material having a different thermal expansion coefficient from that of the first layer 461. For instance, the pressing member 460 may be implemented as a bimetallic plate.

The pressing member 460 may be configured so that the second layer 462 can have a lower thermal expansion coefficient than the first layer 461, so as to be deformed to a convex shape from a flat shape when a first temperature is changed into a second temperature by current supply. A height and a width of a convex shape may be determined by a difference of thermal expansion coefficients between the first layer 461 and the second layer 462. That is, a bent degree of the pressing member 460 may be set based on a difference of thermal expansion coefficients.

For instance, for a high thermal expansion rate, the first layer 461 may be formed of an alloy of nickel, manganese and iron, an alloy of nickel, manganese and copper, or an alloy of nickel, molybdenum and iron. Further, for a low thermal expansion rate, the second layer 462 may be formed of an alloy of nickel and iron.

For instance, the pressing member 460 is configured to be deformable into a convex shape from a flat shape due to a difference of thermal expansion coefficients between the first layer 461 and the second layer 462, when a first temperature is changed into a second temperature by current supply. Also, the pressing member 460 is configured to be deformable into the flat shape from the convex shape, when the second temperature is changed into the first temperature by radiation. That is, the pressing member 460 is configured to have a flat shape at a first temperature, and to have a convex shape at a second temperature due to a difference of thermal expansion coefficients of bimetal.

As another example, the pressing member 460 may be configured so that the second layer 462 can have a higher thermal expansion coefficient than the first layer 461, so as to be deformed to a concaved shape from a flat shape when a first temperature is changed into a second temperature by current supply. A height and a width of a concaved shape may be determined by a difference of thermal expansion coefficients between the first layer 461 and the second layer 462.

So far, a method of applying a force to a flexible display unit by implementing a pressing member as bimetal, and a structure thereof have been explained. The present invention provides a mechanism where an entire region of a flexible display unit is deformed. Hereinafter, such mechanism will be explained with reference to FIGS. 12 and 13.

Figure 12:
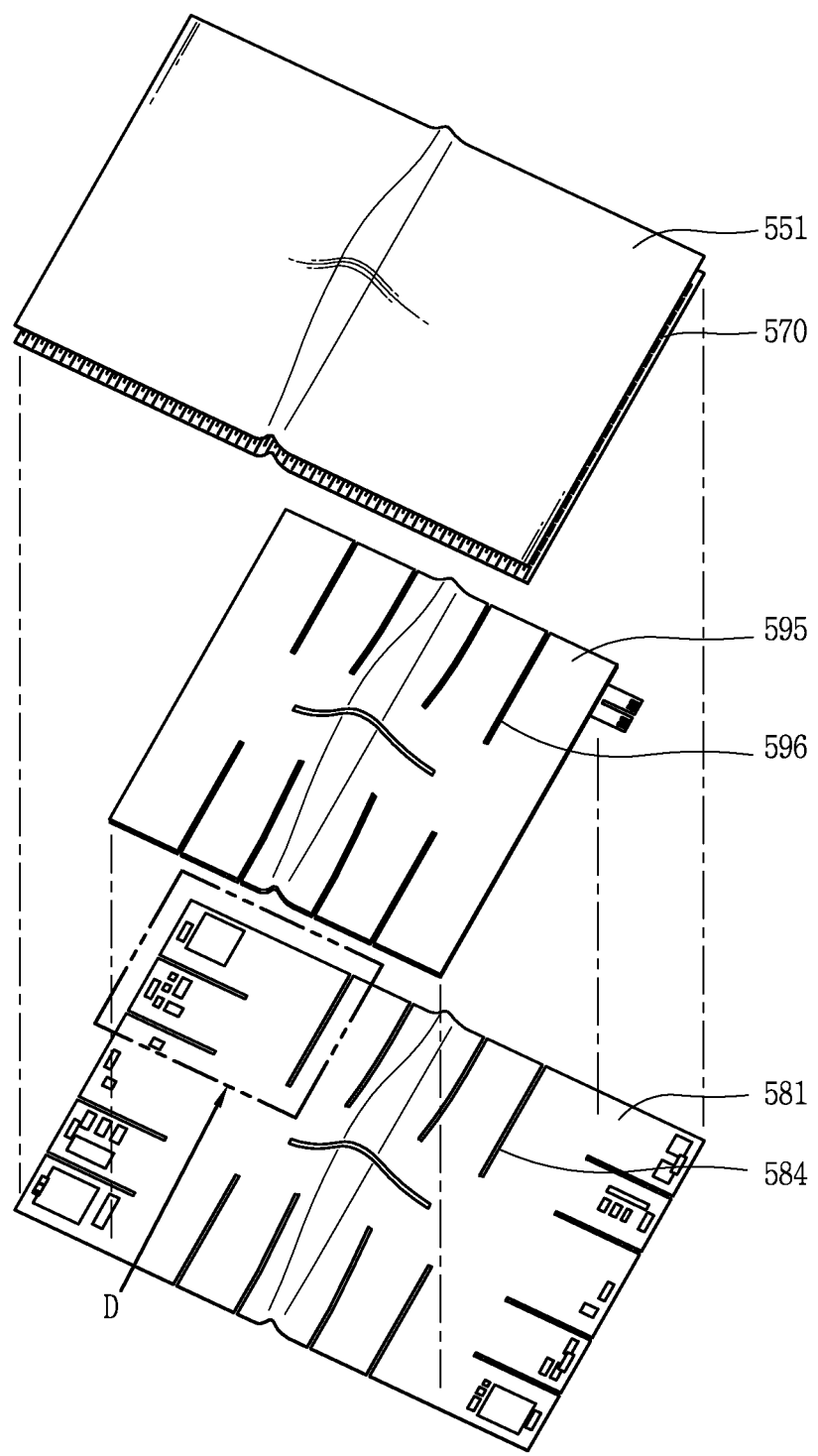
FIG. 12 is an exploded perspective view of a portable electronic device according to another embodiment of the present invention.
Figure 13:
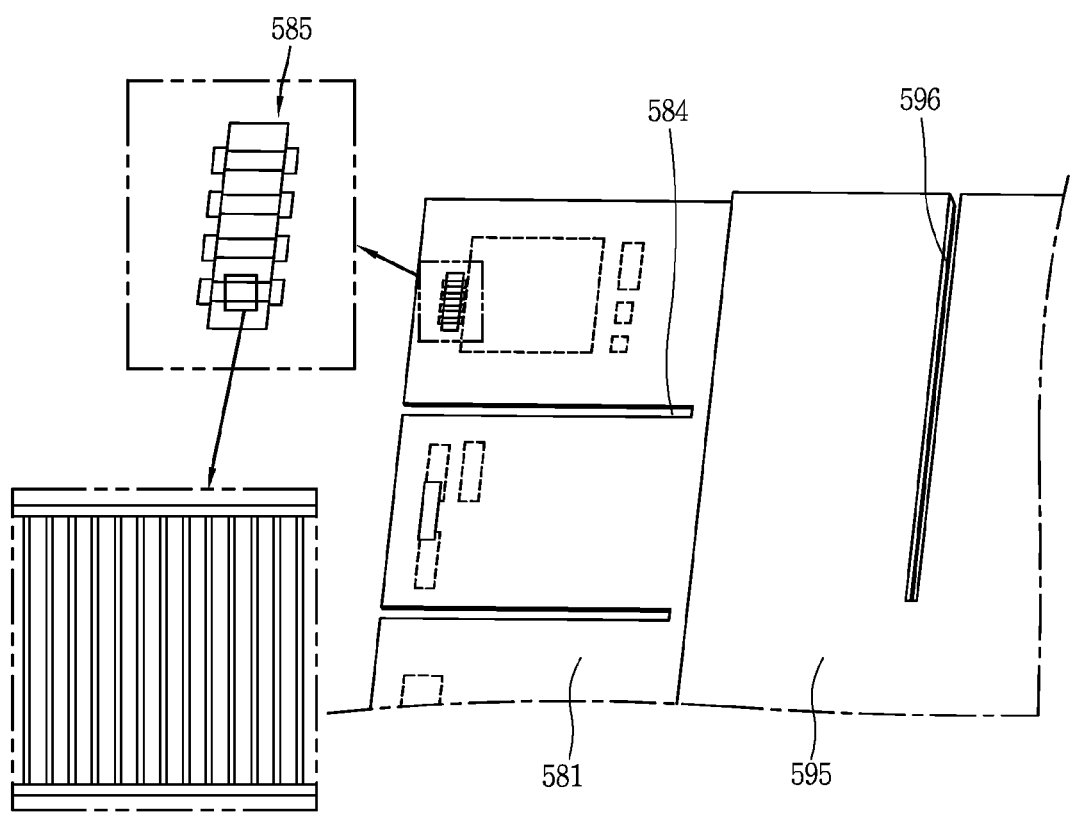
FIG. 13 is an enlarged view of part 'D' in FIG. 12.

In particular, FIG. 12 is an exploded perspective view of a portable electronic device according to another embodiment of the present invention, and FIG. 13 is an enlarged view of part 'D' in FIG. 12. As shown, a supporting member 570 is not disposed on a specific region, but is disposed so as to be covered by an entire region of a flexible display unit 551. Under such structure, a preset region of the flexible display unit 551 may be deformed in a convex manner. For this, a pressing member includes a plurality of shape memory alloy members spaced from each other in a direction parallel to the flexible display unit 551, the shape memory alloy members individually controlled by a controller.

More specifically, a first supporting member is disposed below the flexible display unit. The first supporting member may be implemented so that one of the aforementioned first to fourth through patterns and multi patterns can be formed at a metallic body which entirely covers a rear surface of the flexible display unit. A first pressing member is disposed below the first supporting member. The first pressing member is formed of a shape memory alloy material which is configured to return to the original shape at a specific temperature. Further, the first pressing member includes a plurality of shape memory alloy members spaced from each other in a direction parallel to the flexible display unit 551.

At least part of the plurality of shape memory alloy members is configured to be deformed to a convex shape from a flat shape, when a first temperature is changed into a second temperature by current supply. Other part of the plurality of shape memory alloy members is configured to be deformed to a concaved shape from a flat shape, when a first temperature is changed into a second temperature by current supply. However, the present invention is not limited to this. That is, all of the plurality of shape memory alloy members of the first pressing member are configured to be deformed to a convex shape from a flat shape, when a first temperature is changed into a second temperature by current supply. And all of the plurality of shape memory alloy members are configured to return to the original shape (flat shape), when the second temperature is changed into the first temperature by radiation.

Like in the aforementioned embodiment with reference to FIGS. 5, 6 and 7A~7C, a second supporting member may be disposed below the first pressing member, and a second pressing member, a radiating sheet and a rear cover may be sequentially disposed below the second supporting member. The second supporting member may be implemented so that one of the aforementioned first to fourth through patterns and multi patterns can be formed at a body having a size corresponding to the first supporting member.

Referring to FIG. 12, a battery 595 is disposed below a radiating sheet, and a printed circuit board (PCB) 581 is disposed below the battery 595. Since the battery 595 is stacked with the flexible display unit 551, it is preferably configured to be deformable together with the flexible display unit 551. For the battery 595, a stack and folding type where battery cells are stacked may be applied. Slits 596 for a flexible deformation may be disposed on one surface of the battery 595.

The PCB 581 may be implemented as a flexible PCB which can be bent or folded together with the flexible display unit 551. Slits 584 for a flexible deformation may be disposed on one surface of the flexible PCB. The slits 584, formed in a lengthwise direction or widthwise direction of the portable electronic device, may be disposed to face the slits 596 of the battery. An application processor (AP) chip or a memory, among devices to be mounted to the flexible PCB, may be disposed at an edge of the flexible PCB.

The PCB 581 and the battery 595 can be electrically connected to each other by a contact pad 585. The contact pad 585, where signal regions and non-signal regions are repeated, may be implemented as a zebra contact pad. Under such structure, the portable electronic device is deformable in a convex manner, on an entire region of the flexible display unit. The present invention provides a mechanism where the portable electronic device is made to stand up. Such mechanism will be explained with reference to FIGS. 14 and 15.

Figure 14:
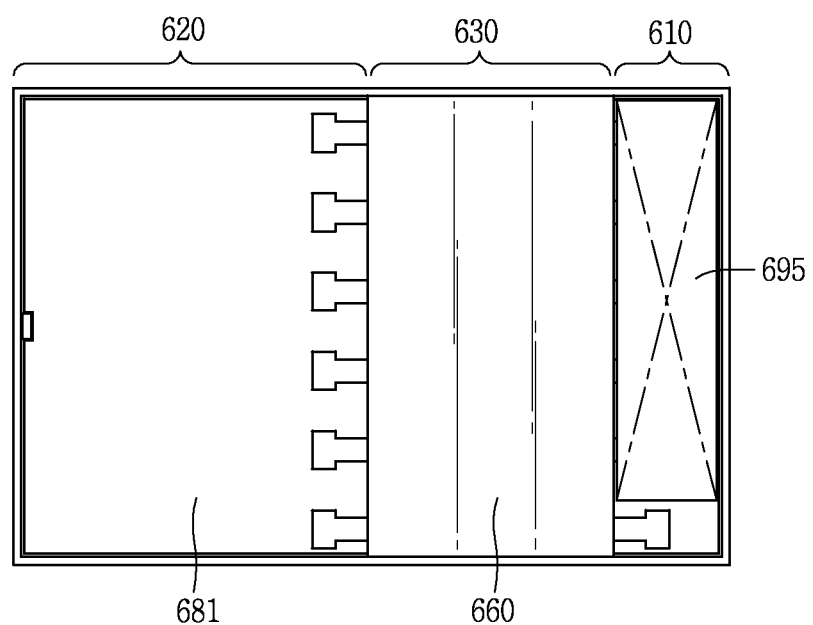
FIG. 14 is an exploded perspective view of a portable electronic device according to another embodiment of the present invention.
Figure 15:
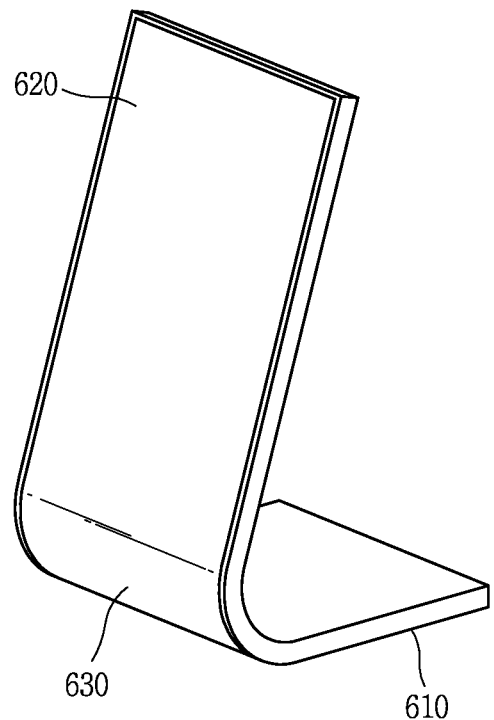
FIG. 15 is a conceptual view illustrating a control method implemented by the portable electronic device of FIG. 14.
Figure 15:
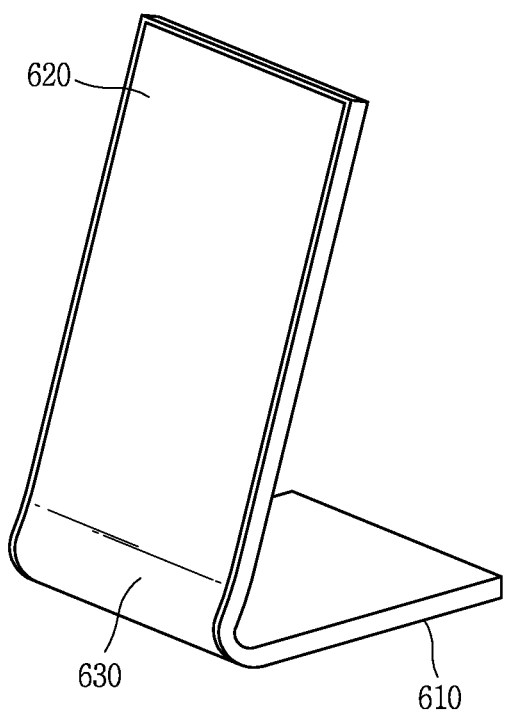

FIG. 14 is an exploded perspective view of a portable electronic device according to another embodiment of the present invention, and FIG. 15 is a conceptual view illustrating a control method implemented by the portable electronic device of FIG. 14. Referring to FIG. 15(*a*), a first region 610 or a second region 620 of the portable electronic device is formed to be rotatable based on a specific region 630. That is, the first region or the second region of a flexible display unit can be rotatable or bendable based on the specific region 630.

In this instance, one of the first and second regions 610 and 620 may be supported on a floor surface, and another thereof may be made to stand up by being bent based on the specific region (hereinafter, will be referred to as a 'third state'). The first region 610 has a flat surface and is disposed on the floor surface in parallel to the floor surface. The second region 620 has a flat surface and is disposed to stand up. The second region 620 may output visual information to outside in such erected state. As another example, in the third state, a call signal may be received for a call. A battery may be charged for the third state. In this instance, one of the first and second regions 610 and 620 can be disposed on a charging surface of a charger. However, the present invention is not limited to this. That is, one of the first and second regions 610 and 620 can have a flat surface without being disposed on either a floor surface or a charging surface. That is, when the portable electronic device is not disposed on either a floor surface or a charging surface, one of the first and second regions 610 and 620 can cross another so that said another can have an erected shape.

In addition, the specific region 630, a region to be bent, may be set as a predetermined region among an entire region of a body of the portable electronic device. Accordingly, a user can bend the body of the portable electronic device based on the preset specific region 630.

Referring to FIG. 15(*b*), the portable electronic device may be configured so that the specific region 630 can be deformed in a convex manner in the third state. As the specific region 630 is deformed in a convex manner, an area of the portable electronic device supported on a floor surface can be increased. This allows the portable electronic device to be supported more stably.

Referring to FIG. 14, between first and second regions 610 and 620, a region to be disposed on a floor surface may be the first region 610. In this instance, a pressing member

660, a supporting member and a radiating sheet can be provided at a specific region 630, so that various types of deformations aforementioned with reference to FIGS. 3B-3D may be controlled. A battery 695 may be disposed at the first region 610, and a PCB 681, a speaker, a microphone, a camera, etc. may be disposed at the second region 620. Since a battery having a relatively larger weight is disposed at the first region 610, a posture of the portable electronic device can be fixed more stably.

Figure 16:
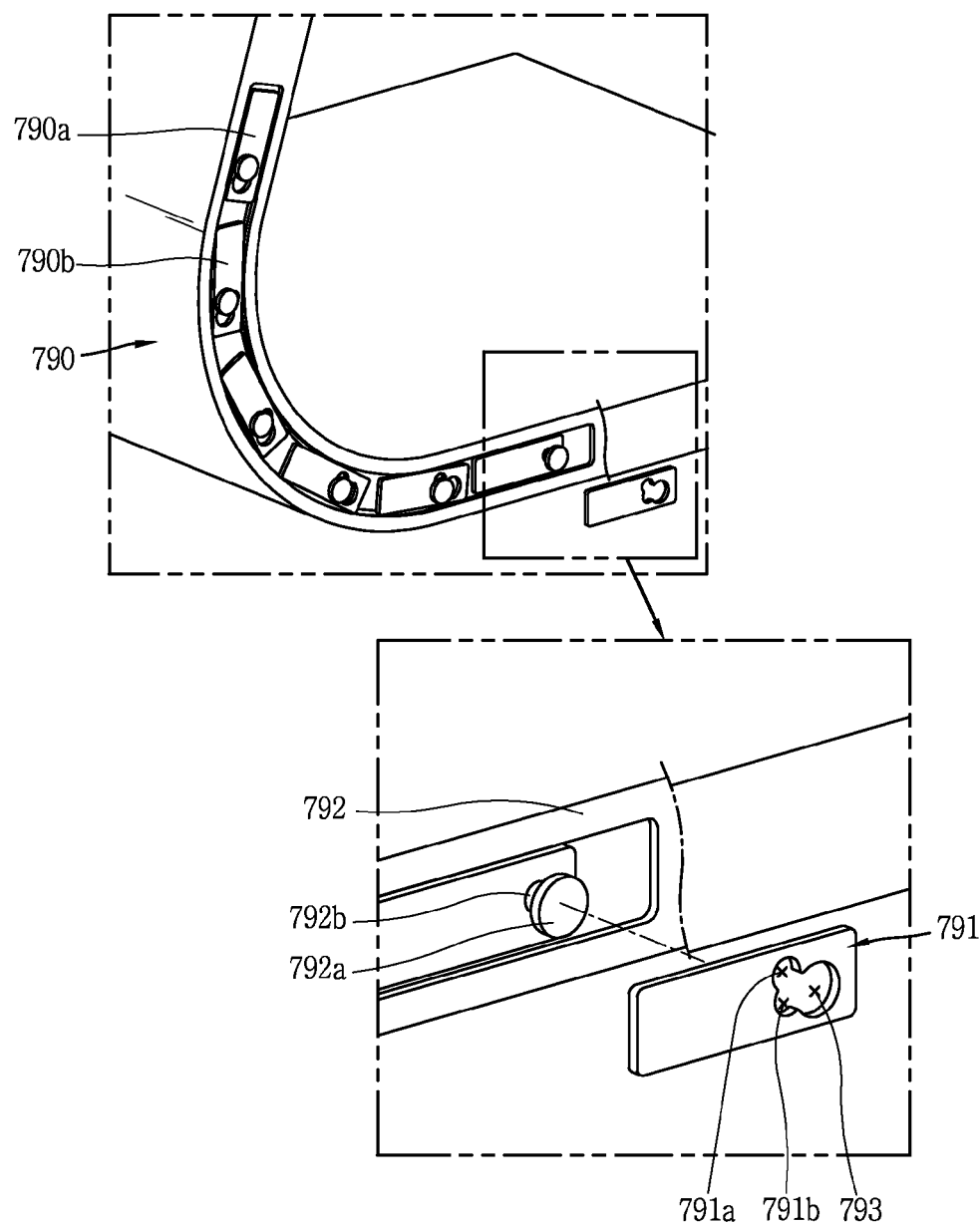
FIG. 16 is a sectional view of a portable electronic device according to another embodiment of the present invention.

The present invention provides a mechanism where a bending size of the specific region 630 is set in various manners. Such mechanism will be explained in more detail with reference to FIGS. 16 and 17. In particular, FIG. 16 is a sectional view of a portable electronic device according to another embodiment of the present invention, and FIG. 17 is a conceptual view illustrating a plurality of operations implemented by the portable electronic device of FIG. 16.

Figure 17:
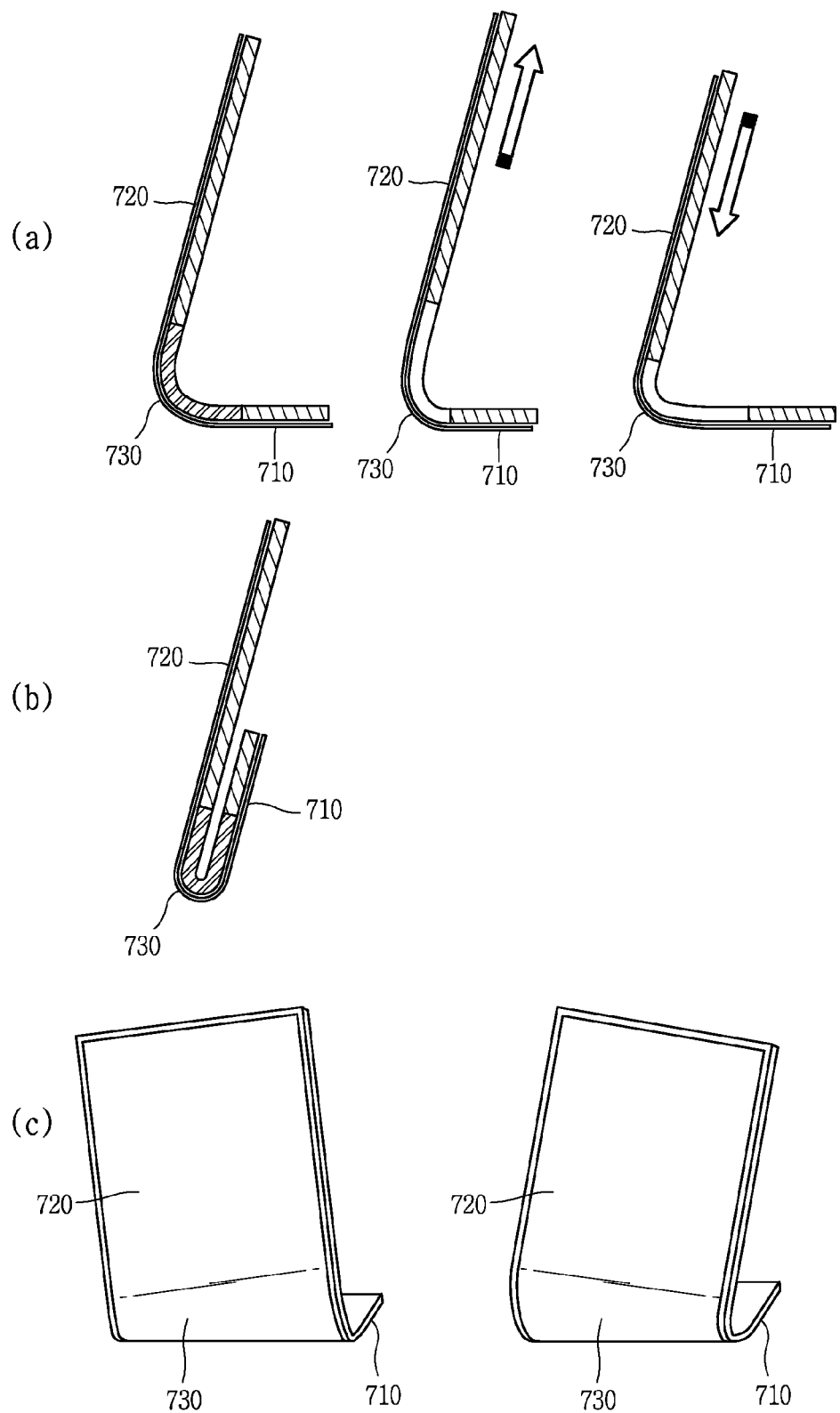
FIG. 17 is a conceptual view illustrating a plurality of operations implemented by a portable electronic device according to an embodiment of the present invention.

Referring to FIG. 17, a specific region 730 (a foldable region) may be bendable based on a plurality of points. As shown in FIG. 17(*a*), as the specific region 730 is bent based on a plurality of points, a height of the second region 720 can be set in various manners. As shown in FIG. 17(*b*), the specific region 730 may be completely foldable. As shown in FIG. 17(*c*), a bending position may become different at two sides of the specific region 730. Under such structure, the portable electronic device can be tilted right and left, after the second region 720 is made to stand up.

The aforementioned operations may be implemented by a locking module 790. Referring to FIG. 16, the locking module 790, which has a hinge structure where the same patterns are repeatedly formed is disposed on an inner side of a cover. The locking module 790 helps a supporting member deform flexibly. Further, the locking module 790 is provided with a plurality of locking portions 790*a* and 790*b*. The plurality of locking portions 790*a* and 790*b* are repeatedly arranged in a lengthwise direction of the portable electronic device.

The plurality of locking portions 790*a* and 790*b* include a first locking member 791 having locking holes 791*a* and 791*b*, and a second locking member 792 having a protrusion 792*a* inserted into the locking holes 791*a* and 791*b*. The first and second locking members 791 and 792 may be disposed at two edges of a specific region, in a symmetric manner.

The locking holes 791*a* and 791*b* of the first locking member 791 are formed to overlap each other partially or wholly. Under such configuration, a locking jaw configured to restrict the protrusion 792*a* from moving from one of the locking holes 791*a* and 791*b* to another may be provided. More specifically, the first and second locking members 791 and 792 are positioned so that the protrusion 792*a* is in a fitted state into the second locking hole 791*b*, when a specific region has a flat surface. Such fitted state of the protrusion 792*a* into the second locking hole 791*b* can be fixed by the locking jaw. In this instance, the protrusion 792*a* is completely moved to the first locking hole 791*a* by passing through the locking jaw.

For such movement, a through hole 793 is provided at one side of the locking holes 791*a* and 791*b*. The through hole 793 may overlap part of the locking holes 791*a* and 791*b*. More specifically, a distance (L1) from a point (A) where the first and second locking holes 791*a* and 791*b* meet with each other, to a point (B) where the first locking hole 791*a* meets with the through hole 793 is shorter than a distance (L2). The distance (L2) is from the point (A), to a point (C) where the second locking hole 791*b* meets with the through hole 793 (refer to FIG. 7C). Under such structure, the protrusion 792*a* can easily pass through the locking jaw when the portable electronic device is converted from a flat state to a curved state. However, a force more than a predetermined level is required for the protrusion 792*a* to pass through the locking jaw, when the portable electronic device is converted from the curved state to the flat state.

A circumference groove 792*b* formed on an outer circumferential surface of the protrusion 792*a* is configured to be locked by the locking holes 791*a* and 791*b*. The protrusion 792*a* is formed to have a larger diameter than the locking holes 791*a* and 791*b*. For an insertion space of the protrusion 792*a* during an assembly process, the through hole 793 may be formed to have a larger diameter than the locking holes 791*a* and 791*b*.

When the protrusion 792*a* is positioned at the first locking hole 791*a*, the locking portions 790*a* and 790*b* may be in a locking state. In this instance, the plurality of locking portions 790*a* and 790*b* may be in a locking state, sequentially. Under such structure, various operations aforementioned with reference to FIG. 18 may be implemented.

More specifically, one of the plurality of locking portions 790*a* and 790*b* may be in a locking state, as the protrusion 792*a* is positioned at the first locking hole 791*a*. In this state, the specific region maintains a bent state based on said one locking portion. If a user presses a region, one of the locking portions 790*a* and 790*b* is in a locking-released state as the protrusion 792*a* moves to the second locking hole 791*b*, and another neighboring locking portion is in a locking state. The plurality of locking portions are sequentially in a locking state. This implements a mechanism where a bending part is changed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the portable electronic device.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable electronic device, comprising:
   a flexible display unit;
   an elastically-deformable supporting member disposed below the flexible display unit and configured to be deformed together with the flexible display unit;
   a pressing member disposed below the supporting member and configured to change shape; and
   a flexible printed circuit board disposed below the flexible display unit and the pressing member, the flexible printed circuit board being spaced from the pressing member in a direction parallel to the flexible display unit, wherein the flexible printed circuit board is electrically-connected to the pressing member and configured to control the pressing member to press against the supporting member to deform the supporting member together with the flexible display unit.

2. The portable electronic device of claim 1, wherein the supporting member comprises:
   a metallic plate; and
   a plurality of slits disposed on one surface of the metallic plate.

3. The portable electronic device of claim 2, wherein the plurality of slits form repeated patterns on the one surface of the metallic plate.

4. The portable electronic device of claim 1, wherein the supporting member includes at least first and second supporting members, and
   wherein the first and second supporting members overlap each other with the pressing member therebetween.

5. The portable electronic device of claim 4, wherein the first supporting member includes a material having a lower rigidity than the second supporting member.

6. The portable electronic device of claim 4, wherein the first supporting member includes slits of a first preset pattern, and the second supporting member includes slits of a second preset pattern different from the first preset pattern.

7. The portable electronic device of claim 1, wherein the pressing member includes a shape memory alloy configured to return to an original shape at a specific temperature.

8. The portable electronic device of claim 7, wherein the flexible printed circuit board is further configured to:
   apply a current supply to the pressing member and change a first temperature of the pressing member to a second temperature and thus change the shape of the pressing member into a convex shape from a flat shape.

9. The portable electronic device of claim 8, wherein the pressing member is further configured to change from the convex shape to the flat shape based on radiation of the second temperature changing back to the first temperature.

10. The portable electronic device of claim 1, further comprising:
    a sensing unit configured to activate when at least part of the flexible display unit is deformed from a flat shape to a convex shape, and sense a push input applied to the flexible display unit in the convex shape.

11. The portable electronic device of claim 10, wherein the pressing member is further configured to return to a flat shape from the convex shape based on the push input.

12. The portable electronic device of claim 1, wherein the pressing member includes a second layer laminated on a first layer and configured to bend when heated, and
    wherein the second layer includes a material having a different thermal expansion coefficient from that of the first layer.

13. The portable electronic device of claim 12, wherein the second layer has a lower thermal expansion coefficient than the first layer, so as to be deformed to a convex shape from a flat shape when the flexible printed circuit board supplies a current to the pressing member to change a first temperature of the pressing member into a second temperature.

14. The portable electronic device of claim 1, further comprising:
    a radiating sheet disposed on a surface of the pressing member and configured to radiate heat generated in the pressing member.

15. The portable electronic device of claim 1, wherein the pressing member includes first and second pressing members, and the supporting member includes first and second supporting members, and
    wherein the first supporting member is disposed below the flexible display unit, the first pressing member is disposed below the first supporting member, the second supporting member is disposed below the first pressing member, and the second pressing member is disposed below the second supporting member.

16. The portable electronic device of claim 1, wherein the supporting member includes first and second supporting members, and
    wherein the first supporting member is disposed below the flexible display unit, the pressing member is disposed below the first supporting member, and the second supporting member is disposed below the pressing member.

17. The portable electronic device of claim 1, wherein the pressing member includes first and second pressing members, and the supporting member includes first and second supporting members, and
    wherein the first pressing member is disposed below the flexible display unit, the first supporting member is disposed below the first pressing member, the second pressing member is disposed below the first supporting member, and the second supporting member is disposed below the second pressing member.

18. The portable electronic device of claim 1, wherein the pressing member includes first and second pressing members, and the supporting member includes first and second supporting members, and
    wherein the first supporting member is disposed below the flexible display unit, the first pressing member is disposed below the first supporting member, the second pressing member is disposed below the first pressing member, and the second supporting member is disposed below the second pressing member.

19. The portable electronic device of claim 1, further comprising:
    a locking module configured to lock the changed shape of the flexible display unit.

20. The portable electronic device of claim 1, wherein the pressing member includes a plurality of shape memory alloy members spaced from each other in a direction parallel to the flexible display unit, and
    wherein the flexible printed circuit board is further configured to individual control the plurality of shape memory alloy members.

* * * * *